(12) United States Patent
Byron et al.

(10) Patent No.: US 10,832,591 B2
(45) Date of Patent: *Nov. 10, 2020

(54) EVALUATING USER RESPONSES BASED ON BOOTSTRAPPED KNOWLEDGE ACQUISITION FROM A LIMITED KNOWLEDGE DOMAIN

(71) Applicant: International Business Machines Corporation, Armonk, NY (US)

(72) Inventors: Donna K. Byron, Petersham, MA (US); Benjamin L. Johnson, Baltimore, MD (US); Dan G. Tecuci, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/266,676

(22) Filed: Feb. 4, 2019

(65) Prior Publication Data

US 2019/0180643 A1 Jun. 13, 2019

Related U.S. Application Data

(63) Continuation of application No. 15/349,057, filed on Nov. 11, 2016, now Pat. No. 10,217,377.

(51) Int. Cl.
*A63F 9/24* (2006.01)
*G09B 19/00* (2006.01)
(Continued)

(52) U.S. Cl.
CPC ......... *G09B 19/0092* (2013.01); *G06N 5/022* (2013.01); *G06N 20/00* (2019.01); *G09B 5/02* (2013.01); *G09B 7/02* (2013.01)

(58) Field of Classification Search
CPC ....... G09B 19/0092; G09B 19/06; G09B 7/06
See application file for complete search history.

(56) References Cited

U.S. PATENT DOCUMENTS 5,610,812 A 3/1997 Schabes et al.
6,816,830 B1 11/2004 Kempe et al.
(Continued)

OTHER PUBLICATIONS

List of IBM Patents or Patent Applications Treated as Related, Feb. 4, 2019, 2 pages.

(Continued)

*Primary Examiner* — Steve Rowland
(74) *Attorney, Agent, or Firm* — Stephen J. Walder, Jr.; Feb R. Cabrasawan

(57) ABSTRACT

Mechanisms for training a human user to perform an operation and provided. The mechanisms generate a domain specific knowledge base comprising a set of entities and corresponding domain specific attributes and expand the domain specific knowledge base to include values for the domain specific attributes through an automated bootstrap learning process that performs natural language processing and analysis of natural language content using a set of pre-condition annotated action terms, thereby generating an expanded domain specific knowledge base. The mechanisms evaluate an input from another device identifying an action associated with an entity in the set of entities, based on a retrieved domain specific attribute value and the retrieved pre-condition annotation from the expanded domain specific knowledge base. The mechanisms output a notification to a user computing device indicating whether the input is correct or incorrect to thereby train a user associated with the user computing device.

18 Claims, 10 Drawing Sheets

(51) Int. Cl.
*G06N 5/02* (2006.01)
*G09B 7/02* (2006.01)
*G09B 5/02* (2006.01)
*G06N 20/00* (2019.01)

(56) References Cited

U.S. PATENT DOCUMENTS

| | | | |
|---|---|---|---|
| 7,377,785 B2 * | 5/2008 | Ullman | G09B 7/02 434/323 |
| 8,275,803 B2 | 9/2012 | Brown et al. | |
| 8,805,861 B2 | 8/2014 | Boyan | |
| 9,519,620 B1 | 12/2016 | Pinel et al. | |
| 9,558,740 B1 | 1/2017 | Mairesse et al. | |
| 9,702,858 B1 | 7/2017 | Minvielle | |
| 9,972,318 B1 | 5/2018 | Kelly et al. | |
| 10,056,078 B1 | 8/2018 | Shepherd et al. | |
| 10,102,844 B1 | 10/2018 | Mois et al. | |
| 10,102,851 B1 | 10/2018 | Kiss et al. | |
| 10,163,436 B1 | 12/2018 | Slifka et al. | |
| 10,170,116 B1 | 1/2019 | Kelly et al. | |
| 10,217,377 B2 | 2/2019 | Byron et al. | |
| 2004/0253569 A1 * | 12/2004 | Deane | G09B 7/00 434/178 |
| 2007/0072164 A1 * | 3/2007 | Katsuyama | G09B 7/02 434/353 |
| 2009/0287678 A1 | 11/2009 | Brown et al. | |
| 2011/0066587 A1 | 3/2011 | Ferrucci et al. | |
| 2011/0123967 A1 * | 5/2011 | Perronnin | G09B 17/006 434/178 |
| 2011/0125734 A1 | 5/2011 | Duboue et al. | |
| 2011/0257961 A1 * | 10/2011 | Tinkler | G09B 7/06 704/9 |
| 2011/0296314 A1 * | 12/2011 | Prasad | G06F 8/10 715/744 |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0149679 A1 | 6/2013 | Tokuda et al. | |
| 2013/0149688 A1 * | 6/2013 | Bean | G09B 5/00 434/362 |
| 2014/0289173 A1 | 9/2014 | Byron et al. | |
| 2015/0356142 A1 | 12/2015 | Proux | |
| 2016/0179659 A1 | 6/2016 | Champlin-Scharff et al. | |
| 2016/0179935 A1 | 6/2016 | Bhattacharjya et al. | |
| 2016/0364377 A1 | 12/2016 | Krishnamurthy | |
| 2017/0092146 A1 * | 3/2017 | Shimada | H04N 1/00795 |
| 2017/0372335 A1 | 12/2017 | Kozloski et al. | |
| 2018/0137419 A1 | 5/2018 | Byron et al. | |
| 2018/0137420 A1 | 5/2018 | Byron et al. | |
| 2018/0165732 A1 | 6/2018 | Ezra et al. | |

OTHER PUBLICATIONS

Boltuzic, Filip, "Computational Approaches to Argumentation in Natural Language Text", University of Zagreb Faculty of Electrical Engineering and Computing , https://www.fer.unizg.hr/_download/repository/KDI%2C_Filip_Boltuzic.pdf, accessed from the Internet on Sep. 27, 2016, 7 pages.

Bramsen, Philip et al., "Finding Temporal Order in Discharge Summaries", AMIA 2006 Symposium Proceedings, Nov. 11-15, 2006, 5 pages.

Carlson, Andrew et al., "Toward an Architecture for Never-Ending Language Learning", AAAI. vol. 5, Jul. 2010, 8 pages.

Frank, Eibe et al., "Text Categorization Using Compression Models", In Proceedings of DCC-00, IEEE Data Compression Conference, Feb. 2000, 10 pages.

High, Rob, "The Era of Cognitive Systems: An Inside Look at IBM Watson and How it Works", IBM Corporation, Redbooks, Dec. 12, 2012, 16 pages.

Manikonda, Lydia et al., "AI-MIX: Using Automated Planning to Steer Human Workers Towards Better Crowd-Sourced Plans", An Adjunct to the Proceedings of the Second AAAI Conference on Human Computation and Crowdsourcing. Nov. 2014, pp. 42-43.

McCord, M.C. et al., "Deep parsing in Watson", IBM J. Res. & Dev. vol. 56 No. 3/4 Paper 3, May/Jul. 2012, pp. 3:1-3:15.

Mitchell, T. et al., "Never Ending Learning", AAAI, Feb. 2015, 9 pages.

Moens, Marie-Francine et al., "Automatic Detection of Arguments in Legal Texts", Proceedings of the 11th international conference on Artificial intelligence and law, ACAIL, '07, Jun. 4-8, 2007, ACM 2007, 6 pages.

Paul, Arun K. et al., "A Fine-Grained Tagset for Bengali Language", SUST Journal of Science and Technology, vol. 21, No. 1, Jan. 2014; pp. 1-8.

SáNCHEZ, David, "A Methodology to Learn Ontological Attributes from the Web", Data & Knowledge Engineering Issue 69, vol. 6, Mar. 2010, 25 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

List of IBM Patents or Patent Applications Treated as Related, May 14, 2020, 2 pages.

Pinel, Florian, "What's Cooking with Chef Watson?", Pervasive Computing, IEEE CS, Oct.-Dec. 2015, pp. 58-62.

* cited by examiner

Double-Dutch Mac and Cheese with Chard

=== Description ===
* Servings: 10 to 12

=== Ingredients ===
* 6 tablespoons (3/4 stick) butter, divided
* 1 cup chopped onion
* 2 garlic cloves, minced
* 1/4 cup unbleached all purpose flour
* 3 cups reduced-fat (2%) milk
* 2 cups (packed) coarsely grated aged Gouda cheese plus 1/2 cup finely grated (about 10 ounces total)
* 2 cups (packed) coarsely grated Edam cheese, divided
* 1/4 teaspoon cayenne pepper
* 1/8 teaspoon ground nutmeg
* 1 1/2 pounds Swiss chard, stems and center ribs removed
* 12 ounces elbow macaroni
* 1 cup fresh breadcrumbs made from crustless sourdough bread
* 1 teaspoon cumin seeds (optional)

=== Directions ===
Melt 3 tablespoons butter in large pot over medium heat. Add onion; sauté until translucent, about 5 minutes. Stir in garlic, then flour; stir constantly 1 minute. Gradually whisk in milk. Cook, whisking occasionally, until mixture begins to boil, about 5 minutes. Add 2 cups coarsely grated Gouda and 1 cup Edam. Stir until cheeses melt, about 2 minutes. Stir in cayenne and nutmeg. Season sauce with salt and pepper.
Preheat oven to 350°F. Butter 13x9x2-inch baking dish. Cook chard in large pot of boiling salted water until tender, about 1 minute. Using slotted spoon, transfer chard to plate; cool. Reserve pot with water. Squeeze water from chard; chop finely.
Return water in pot to boil. Add macaroni; cook until tender but still firm to bite, stirring occasionally. Drain. Stir macaroni into warm cheese sauce. Place half of macaroni in dish; smooth top. Top with 1 cup Edam cheese, then chard. Top with remaining macaroni mixture; spread evenly.
Melt 3 tablespoons butter. Place breadcrumbs in medium bowl. Drizzle butter over; toss. Add 1/2 cup finely grated Gouda and sprinkle with salt and pepper; toss. Sprinkle breadcrumb mixture over mac and cheese. Sprinkle cumin seeds over, if desired.
Bake mac and cheese until breadcrumbs are golden and edges are bubbling, about 40 minutes. Let stand 10 minutes.

FIG. 4

LEARN TO PREPARE DOUBLE-DUTCH MACARONI AND CHEESE WITH CHARD

6 TBSP BUTTER
1 CUP CHOPPED ONION
2 GARLIC CLOVES...

810

QUESTION: WHAT IS THE FIRST STEP TO GENERATING THE MACARONI AND CHEESE MIXTURE?

820

ANSWER: I WOULD POUR THE BUTTER OVER THE ONIONS

830

SUBMIT

*FIG. 8A*

LEARN TO PREPARE DOUBLE-DUTCH MACARONI AND CHEESE WITH CHARD

INCORRECT ANSWER    850

THE ANSWER PROVIDED IS INCORRECT SINCE THE BUTTER IS IN A SOLID FORM AND IS NOT IN A FORM TO BE POURED

860

CORRECT ANSWER: MELT THE BUTTER

870

REASON FOR CORRECT ANSWER: MELTING THE BUTTER WILL PUT IT INTO A LIQUID FORM

EVALUATING USER RESPONSES BASED ON BOOTSTRAPPED KNOWLEDGE ACQUISITION FROM A LIMITED KNOWLEDGE DOMAIN

This application is a continuation of application Ser. No. 15/349,057, flied Nov. 11, 2016, status awaiting publication.

BACKGROUND

The present application relates generally to an improved data processing apparatus and method and more specifically to mechanisms for evaluating user responses based on bootstrapped knowledge acquisition from natural language content.

When reading through natural language content, such as recipes from a cooking domain, real-world common sense knowledge provides constraints on an ingredient and the actions to be performed on the ingredient. For example, it is common sense that cottage cheese cannot be grated. However, in the absence of such common sense, it is difficult to learn such knowledge from simply reading a recipe. Further, when asked to produce a recipe for a particular dish, not being aware of the various actions that can be performed on an ingredient can produce nonsensical results. For example, when requested to produce a recipe for a cheese fondue from a round wheel of cheese, one may cut, slice, grate, or melt the cheese, but one may not pour the cheese until after the cheese has first been sliced and then melted.

Recently, International Business Machines (IBM) Corporation of Armonk, N.Y., has released an intelligent cooking recipe application referred to as IBM Chef Watson™. IBM Chef Watson™ searches for patterns in existing recipes and combines them with an extensive database of scientific (e.g., molecular underpinnings of flavor compounds) and cooking related information (e.g., what ingredients go into different dishes) with regard to food pairings to generate ideas for unexpected combinations of ingredients. In processing the database, IBM Chef Watson™ learns how specific cuisines favor certain ingredients and what ingredients traditionally go together, such as tomatoes and basil. The application allows a user to identify ingredients that the user wishes to include in the recipe, ingredients that the user wishes to exclude, as well as specify the meal time (breakfast, lunch, dinner), course (appetizer, main, dessert), and the like.

The IBM Chef Watson™ has inspired the creation of an IBM Chef Watson™ food truck, a cookbook entitled Cognitive Cooking with Chef Watson™, Sourcebooks, Apr. 14, 2015, and various recipes including a barbecue sauce referred to as Bengali Butternut BBQ Sauce.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system includes a processor and a memory accessible by the processor, for training a human user to perform an operation. The method comprises generating, by the data processing system, a domain specific knowledge base comprising a set of entities and corresponding domain specific attributes. The method further comprises expanding, by the data processing system, the domain specific knowledge base to include values for the domain specific attributes through an automated bootstrap learning process that performs natural language processing and analysis of natural language content using a set of pre-condition annotated action terms, thereby generating an expanded domain specific knowledge base. Moreover, the method comprises obtaining, by the data processing system, an input from another device identifying an action associated with an entity in the set of entities, and retrieving, by the data processing system, from the expanded domain specific knowledge base, a domain specific attribute value for the entity identified in the input and a pre-condition annotation associated with the action identified in the input. In addition, the method comprises evaluating, by the data processing system, a correctness or incorrectness of the input based on the retrieved domain specific attribute value and the retrieved pre-condition annotation. Furthermore, the method comprises outputting, by the data processing system, a notification to a user computing device indicating whether the input is correct or incorrect to thereby train a user associated with the user computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 illustrates an example recipe upon which the mechanisms of the illustrative embodiments may operate;

FIG. 8A is an example diagram of a training/testing system prompt output that may be provided to a user via a user client system in accordance with one illustrative embodiment;

FIG. 8B is an example diagram of an example response of a training/testing system to a user input in accordance with one illustrative embodiment;

DETAILED DESCRIPTION

Figure 1:
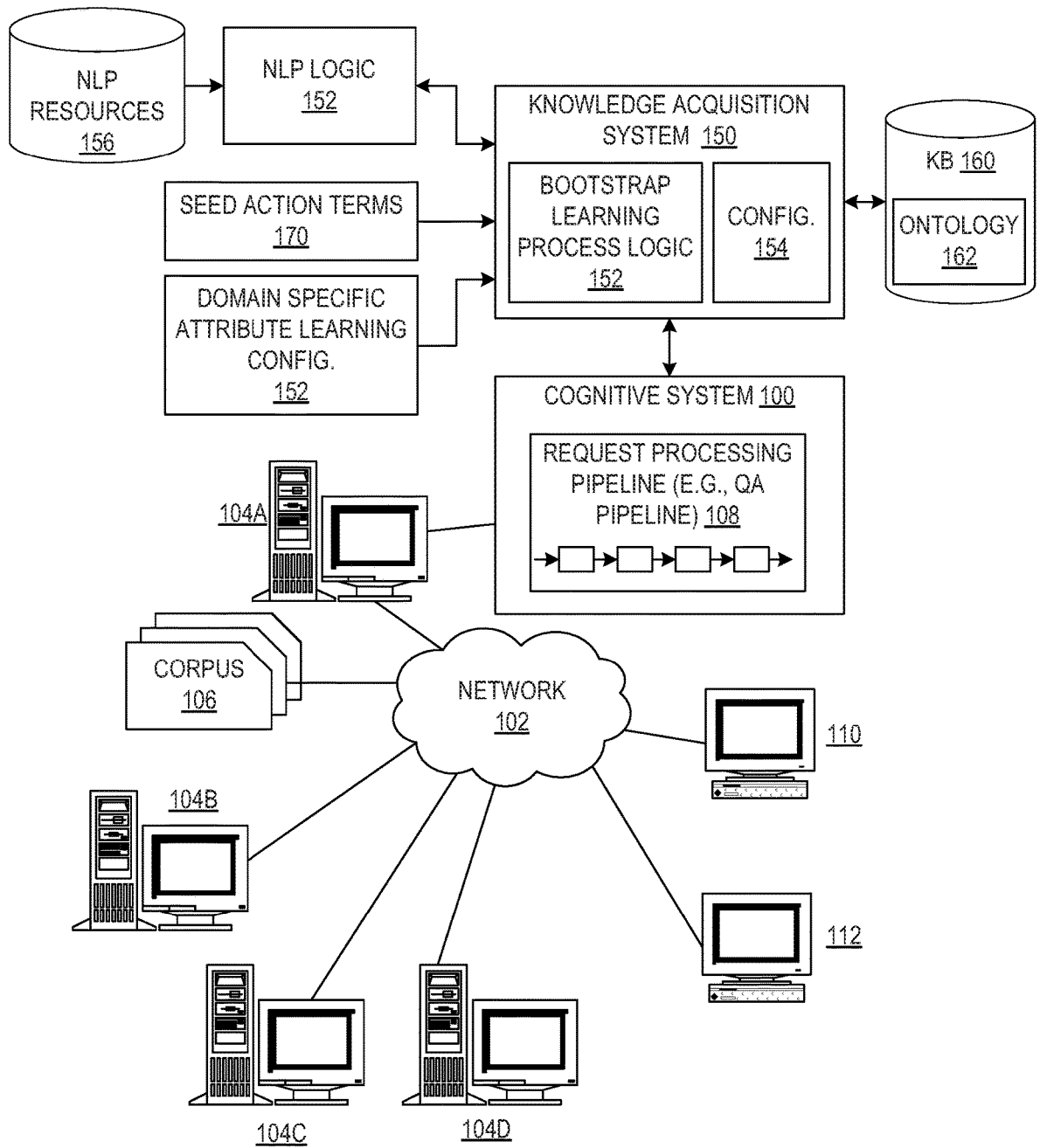
FIG. 1 depicts a schematic diagram of one illustrative embodiment of a question/answer (QA) system in a computer network.

The illustrative embodiments provide mechanisms for bootstrapping a small amount of manually acquired domain knowledge to automatically build a much larger set of domain knowledge, where the knowledge acquired includes the usage constraints on entities in the domain, expressed as feature compatibilities between an entity (such as an object) and a verb (which is an action to be performed on, to, or with the object). The mechanisms of the illustrative embodiments may be applied to many different types of domains in which learning of the relationships between actions and entities is desirable, and especially in domains where an ordered series of tasks or operations are performed on an object, with each task or operation potentially changing the object's state. For example, the illustrative embodiments may be implemented with regard to the medical and scientific laboratory domain, art domain, financial domain, criminal investigation domain, and a plethora of other domains.

One example of these many domains for which this mechanism may be applied, and which will be used as an example throughout this description for non-limiting illustration purposes, is the cooking domain in which real-world common sense knowledge provides strong constraints on entity/action compatibility, such as knowing that "cottage cheese" cannot be "grated." The illustrative embodiments are advantageous from other solutions to acquire knowledge, such as common sense knowledge that human beings take for granted, because while there is initially a minimal manual activity related to seeding a collection of domain knowledge, thereafter the embodiments automatically augment the collection of domain knowledge from ingesting a corpus of documents from the relevant domain (it should be appreciated that references to "documents" in the present description means electronic documents provided as data structures that are able to be processed by a computing device). As time progresses, the collection of domain knowledge grows building common sense knowledge about entity/verb (or action) compatibility.

The illustrative embodiments are thus, directed to solutions for solving the problems associated with computing devices, and in particular cognitive systems, with regard to the amount of knowledge that the computing devices or cognitive systems have to perform their operations. That is, it should be appreciated that while it is relatively straight forward for human beings to recognize constraints on entity/verb compatibility because human beings already have a collection of knowledge about entities, actions, and language usage that informs them of the attributes of entities which the human being can correlate with the constraints of the verb, this is not readily understandable by computing systems which do not have such a collection of knowledge, or have relatively limited knowledge based on whatever the human beings using those computer systems have provided them.

For example, while a human being may readily understand that one cannot "pour" bread, a computer may not readily have this knowledge when it is analyzing the terms "pour" and "bread" in natural language, unless it has additional knowledge about the attributes and constraints associated with these terms given to it by a human being, e.g., that "pouring" is an action performed on objects that are liquid or sometimes particulates, while "bread" is a solid. This is because computing devices do not "think" in the same way that human beings do and must specifically be given information upon which to base its operations, i.e. they do not have any perception of the real world. Generating sets of information for use by computing devices performing cognitive operations using natural language processing mechanisms in particular is problematic both from the view point of the amount of time and resources required to generate such information such that it may be presented to a computing device, but also in terms of the human limitations and errors that lead to gaps in such information.

Moreover, it is difficult to extract knowledge from natural language content itself. This difficulty arises from several facts. First, the computing system attempting to gather the knowledge, such as for identifying incompatibilities between objects and actions (entity/verbs) must be able to differentiate combinations where the knowledge simply did not appear in the training data used to train the computing system versus actual incompatibilities where the actions just do not make sense with regard to the entities, e.g., the computer just does not know whether the entity/verb pair is unusual or the entity/verb pair is in fact incorrect.

Second, many times, such as in the case where a sequenced set of actions or tasks are being performed on the same or a variety of different objects, the knowledge that needs to be known may be with regard to entities/actions that are modified over the course of the natural language content describing the sequenced set of actions or tasks, and the computing system would not be aware of this modification from the natural language content itself. For example, in the cooking domain, butter may initially be in a solid state but is sometimes melted and then poured. Thus, using known mechanisms that merely look at co-occurrence of terms, e.g., a document that comprises natural language content specifying that pour has a co-occurrence with butter, the knowledge that would be gained from the text would be that butter may be melted and butter may be poured, without actually understanding that different states of the entity are required for these different actions to be performed, i.e. the computer system would only know that butter can be poured and would not know that the butter must first be put into a liquid state before being poured, such as by way of melting a solid state of the butter to make a liquid state of the butter. That is, the computer does not know that different actions require or are constrained for use with entities having specific states.

Third, many times the knowledge that needs to be learned may be part of general common sense knowledge and thus, is not specifically stated explicitly in the natural language content itself. For example, a natural language electronic document that describes an onion, such as the Wikipedia™ online encyclopedia entry for "onion", may not state that the onion is a solid object since this is general common sense to human beings, even though this knowledge is not "common sense" for the computing device. Again, the computing device does not have the real world experience and knowledge that is inherently gathered through existence as does a human mind and thus, a computing device must be explicitly given the information upon which it can perform operations or else that information simply does not exist in the view of the computing device.

In addition to the above, with cognitive systems that are trained using training set data, the natural language content that is used for training is rife with missing entity arguments and therefore, provides very sparse coverage for the knowledge that needs to be acquired. That is, it is desirable to have complete coverage of the attributes of an entity, in an ontology of concepts, for which the knowledge is being acquired, e.g., in the cooking domain it is desirable to know the state of matter attributes for all ingredients in an ingredient database. However, most attribute assignment methods, such as manually populating a knowledge graph with entities and their attributes, allow for sparse coverage of the entity attributes, e.g., not all of the entities in a knowledge graph or ontology will have the same attributes populated with values or have the same set of attributes themselves. That is, one entity may have an attribute of "color" while another may not have that attribute and instead may have an attribute of "texture". This presents problems for various cognitive systems which require concepts in an ontology to be labeled with certain attributes, common across all entities in the knowledge graph or ontology, in order for those cognitive systems to be able to perform their cognitive operations. That is, if the knowledge source does not have the attributes required by the cognitive system, then the cognitive system cannot operate properly due to a lack of knowledge.

For example, in the IBM Chef Watson™ cognitive system, it is important to know the state of matter of ingredients, e.g., solid, liquid, particulate, etc., whether the ingredient is chewable, and a number of other attributes of ingredients that lead to cognitive decisions being made by the IBM Chef Watson™ cognitive system. Acquiring this information manually is a daunting task as the number of ingredients increases (currently there are over 3600 ingredient entries). Acquiring multiple features for all of these ingredients manually may take several months, or even years, of human effort. Moreover, with such a large number of attributes having to be populated by human beings, errors are inevitable and can cause significant performance problems for the cognitive system.

As noted above, in a first aspect of the illustrative embodiments, mechanisms are provided for bootstrapping a small amount of manually acquired domain knowledge to automatically build a much larger set of domain knowledge, where the knowledge acquired may be based on the usage constraints of actions being performed on entities in the domain, expressed as feature correlations or compatibility between an entity, e.g., represented as a noun in natural language content, and an action, e.g., represented as a verb in natural language content. The illustrative embodiments utilize this small set of domain knowledge, along with some knowledge and assumptions about the language of the natural language content, to infer attributes of entities and thereby expand the domain knowledge. It should be appreciated that the term "domain knowledge" as it is used herein refers to knowledge about attributes of entities where those attributes are important to performing cognitive operations in a specific domain. For example, domain knowledge for a knife in the cooking domain may include an attribute that a knife "cuts" or "slices" ingredients. However, domain knowledge for a knife in a criminal investigation domain may include attributes such as "weapon" or that the knife "stabs" a victim.

In some illustrative embodiments, a small set of actions (e.g., verbs) are manually tagged with features that indicate constraints on the attributes of entities with which that action may be utilized, e.g., the verb "pour" has a feature that it may be used with entities having a state of matter attribute of "liquid." This relatively small set of action terms, or verbs, are then used to analyze natural language content to infer the attributes of entities by observing the use of the action terms in conjunction with the entities in the natural language content, e.g., a particular ingredient is an argument of that action term (or verb). The inferred attributes of entities generated from the analysis of the usage of action terms, or verbs, in the natural language content in conjunction with an entity term for the entity, may be added to a knowledge base entry for that entity to thereby populate a required attribute field for the entity upon which the cognitive system may operate. In this way, the knowledge base for the cognitive system is automatically expanded through cognitive analysis of natural language content using a small initial set of tagged action terms. Hence, a relatively small amount of human effort is expended through a focused effort to tag a small set of action terms which can then be automatically utilized to generate a relatively larger entity attribute knowledge base.

It should be appreciated that, as touched on above, the attributes of entities inferred through the mechanisms of the illustrative embodiments, may not be explicitly provided in the natural language content itself and may not have been manually provided to the cognitive system prior to encountering the entity in natural language content. In addition, information may be inferred by the mechanisms of the illustrative embodiments regarding changes in attributes of entities. That is, based on the order of the natural language content and the order in which the action terms are present in the natural language content in correlation with the entity, the mechanisms of the illustrative embodiments may determine a proper ordering of attribute information for the entity. For example, in the cooking domain, if a recipe indicates that butter is first "melted" and then "poured" and, in accordance with the illustrative embodiments, the small set of action terms indicate that the term "melt" or "melted" corresponds to entities having a state of matter attribute of "solid", then it can be determined that butter is a solid. Moreover, because the small set of action terms indicate that the term "pour" or "poured" corresponds to entities having a state of matter attribute of "liquid," it can further be inferred that butter is also a "liquid". Based on the ordering of the natural language of the recipe, the illustrative embodiments may determine that butter is initially a solid and can be melted to generate a liquid which can then be poured.

It should be noted that this information is not explicitly stated in the natural language content itself. All that the natural language content indicates is that the butter is to be melted and the butter is to be poured. The knowledge that butter is initially a solid is not present in the natural language content. The knowledge that melting butter generates liquid butter is not present in the natural language content. The knowledge that melting butter to generate liquid butter then allows one to pour the butter is not present in the natural language content. Thus, the mechanisms of the illustrative embodiments expand the knowledge of the ingredient "butter" through automated mechanism that infer attributes about butter which are not present in the natural language content itself, by observing the usage of a small set of action terms (or verbs) in the natural language content and inferring attributes of the entity based on the features or constraints associated with the action terms.

In one example implementation of the mechanisms of the illustrative embodiments, initially it is determined what attributes of entities are to be learned in order to expand the knowledge base for the particular domain, e.g., the knowledge base of ingredients in a cooking domain. For example, in the cooking domain, it may be desirable to learn the state of matter attribute of each ingredient in a knowledge base or ontology.

In addition, for a collection of action terms (or verbs) in a domain specific corpus, pre-condition features are defined for the action terms that are specific to those attributes of the entities that are to be learned. For example, in the cooking domain, if the attribute of the ingredients that is desired to be learned is a state of matter attribute, then the pre-condition features may specify the types of state of matter that the action term operates with, e.g., the action of "pouring" is used with entities having a state of matter of "liquid." It should be appreciated that each action term may have a set of domain specific synonyms associated with it including various forms of the action terms, equivalent action terms, and the like, which may be specified in a resource data structure, such as a synonym dictionary or mapping data structure, and the features of one action term may be associated with each of its synonyms.

With this relatively small set of action terms and their associated pre-condition features that are defined specifically with regard to the attributes of entities that are attempting to be learned, documents of a domain specific corpus, comprising natural language content, are analyzed as part of an automated learning process. The automated learning process, for each document, arranges the recognized action terms found in that document into a correct temporal ordering. For example, in the cooking domain, recipe instructions are expected to be provided in a correct temporal ordering and thus, the order of the action terms will match the ordering of the execution of the recipe instructions. However, in other domains, such ordering may not be implicit and more complex temporal analysis of the natural language content may be performed, such as looking for temporal terms indicating an ordering, e.g., "before," "after", "next," "and then", etc. Any known or later developed mechanism for determining temporal ordering based on analysis of natural language content may be used without departing from the spirit and scope of the present invention. One example mechanism may be the mechanism for discovering temporal sequences described in Bramsen et al., "Finding Temporal Order in Discharge Summaries," AMIA 2006 Symposium Proceedings, pages 81-85.

With the action terms of the document having been ordered according to temporal characteristics, the first action term that operates on or references an entity of interest is identified, e.g., the first time in the ordered action terms that a cooking action term (e.g., an action term of "chop") operates on or references an ingredient entity (e.g., an ingredient entity of "turnips") is identified. It should be noted that entities of interest may be specified, a priori, in a domain specific ontology data structure or knowledge base data structure, for example. For the first occurrence of an action term operating on or referencing an entity of interest, the automated learning process assumes that the entity of interest satisfies the pre-condition features of the action term. That is, if the action term is "chop" and the pre-condition feature for "chop" is that the ingredient must have a state of matter attribute of "solid", then it is assumed that the entity of interest, e.g., "turnips", are solid and thus, satisfy the constraint of the action term. Thus, the pre-condition feature of the action term is then applied to the entity as an attribute of the entity, i.e. the entity is now recognized as having the attribute corresponding to the pre-condition feature.

This newly learned attribute for the entity may be generalized up a domain specific subsumption hierarchy, such as may be provided in a hierarchical ontology data structure for the domain, so that the attribute may be associated with other entities and concepts in the hierarchy. For example, the automated learning process may determine that onions, potatoes, and turnips all have substantial evidence of having a state of matter attribute of "solid." From this, it can be inferred that their common ancestor, e.g., "root vegetable," in a subsumption hierarchy of an ontology also has a state of matter attribute of "solid." This propagated knowledge may then be used to reason about other less common root vegetables for which there may be no prior knowledge. For example, a "skirret" is a root vegetable and thus, from the automatically learned attributes of onions, potatoes, and turnips, and the generalization of the learned attributes up a domain specific subsumption hierarchy, the learned knowledge can be applied to a "skirret" to infer that it also has a state of matter attribute of a "solid" since it is a root vegetable and root vegetables have the state of matter attribute of "solid."

It should be appreciated that, for some action terms, the pre-condition features may be specified in a negative manner, e.g., that the action is performed on entities that are "non-solid". In such a case, the pre-condition feature still provides evidence of an attribute of the entity, however, this attribute may not be specific. That is, for example, if the pre-condition feature states that the action is performed on "non-solid" entities, in the context of a cooking domain, the inferred attribute for the entity is "non-solid" but it still cannot be determined, without further evidence, whether that entity, e.g., an ingredient, has a state of matter attribute of "liquid" or "particulate". All that is known at that time is that the ingredient is not a solid. This is still more knowledge that was previously available for the entity and, with other evidence found through analyzing other documents, may eventually lead to an inference that the particular entity has a state of matter attribute of either "liquid" or "particulate."

It should also be appreciated that, in some illustrative embodiments, this process may be repeated for multiple documents of a corpus and/or portions of documents of a corpus, and each of the action term/entity pairings may be encountered in more than one of these documents and/or portions of documents. As such, evidence may be gathered from the various documents for different values of the attributes of an entity, e.g., one document may indicate butter is a solid while another document may indicate that butter is a liquid looking at the first occurrence of an action term. The evidence for the various values of the attributes of entities subject to the automated learning process obtained from analysis of the various documents of the corpus may be accumulated across these documents to generate evidential scoring data indicating a confidence that a particular value for the attribute is correct. For example, a confidence score for each attribute value of an entity found across the multiple documents or portions of documents may be calculated from an accumulation of the number of instances for each attribute value encountered across the multiple documents, e.g., 86 instances of butter being a solid and 14 instances of butter being a liquid across 100 documents. This evidential scoring data, i.e. confidence scores, may be compared to one or more thresholds to determine whether the amount of evidence is sufficient to associate the value with the attribute of the entity. It should be appreciated that some attribute may have multiple values that are valid, e.g., while a state of matter attribute is mutually exclusive other attributes, such as color, may be discovered to have variations for one entity, such as carrots. Alternatively, multiple instances of an entity may be generated with each instance having a different value of the attribute, e.g., a first instance of butter that is solid and a second instance of butter that is liquid. For those attribute values that meet or exceed the requirement specified by the threshold(s), those attribute values are maintained in association with the entity data structure in the knowledge base or ontology data structure.

The result of this automated learning process is an expanded knowledge base that is expanded with regard to the attributes of the entities for the specific domain or in some cases additional entities and relationships in the knowledge base, e.g., a new entity of "liquid butter" may be generated and linked to a butter entity or to a common root entity. This expanded knowledge base may be represented as an ontology database in which attributes of entities that may have previously been unpopulated are now populated by the knowledge gathered through the automated process described herein. Moreover, this expanded knowledge base may be represented in an ontology database by an expansion of the ontology to include additional entities that may not have previously been in the ontology and which include attributes learned through the automated learning process described herein.

The expanded knowledge base may then be utilized to perform various cognitive operations including, but not limited to, performing question answering or responding to requests for information, correction of natural language documents or text, selecting the correct action word when translating to a different human language, expanding upon the content of a natural language document, training/testing of human users, automatic generation of instructions or commands for controlling the operation of an automated system or device, performing monitoring of human actions or interactions with entities and providing constructive feedback or instruction, and/or the like. More details regarding specific embodiments in which various ones of these cognitive operations will be described in greater detail hereafter.

In further illustrative embodiments, in addition to learning the attribute of the entity from the first occurrence of an action term operating on or referencing the entity as described above, the action term may further have associated features that indicate the result of the action being performed on an entity with regard to an attribute of the entity that is to be learned, with these features being referred to herein as "post-condition" features. For example, melting a solid "post-condition" a liquid. Thus, not only can it be determined what the initial attribute of the entity is when the action corresponding to the action term is applied, but the result of that action on the entity may also be determined and associated with the entity, e.g., butter is a solid and a liquid and that melting solid butter results in liquid butter. In some cases, this may spawn the generation of new entity instances, e.g., a first instance for solid butter and a second instance for liquid butter, thereby further expanding the ontology of entities and concepts for the specific domain.

Applying this knowledge, associated with the action term, to the temporally ordered action terms, the automated learning process may determine the veracity of subsequent action term/entity pairings for the entity in a document or portion of a document and, for those action term/entity pairings deemed to be corrected, may associate attributes to the entity based on the constrains of the subsequent action term or otherwise modify an evidential scoring for an attribute value of the entity. For example, in the cooking domain, assume that a recipe includes the steps of melting the butter and then pouring the butter. As noted above, the first instance of an action term (melting) operating on the entity (butter) may be analyzed to associate a pre-condition feature (solid entity) of the action term (melting) to an attribute (state of matter) of the entity (butter). In addition, a post-condition feature may also be associated with the action term that indicates what the result of the action is with regard to the particular attribute of interest, e.g., melting butter results in a liquid (post-condition feature).

This information may then be used to test the veracity of the next operation performed on the same entity. In this example, the second step is to pour (action term) the butter (entity). The action term "pour" has a pre-condition feature that it operates on liquid entities. A check is made as to whether the temporally previous action term, in the temporally ordered action terms for this entity, has a post-condition feature of "liquid" matching the constraint of the second action term, thereby indicating that the previous action generated a liquid form of the entity. If the post-condition feature matches the pre-condition feature of the next action term in the temporally ordered action term list for this entity, then the second action term is correct and further knowledge about the entity may be obtained by performing a similar analysis as before. That is, a similar analysis of correlating the pre-condition feature of the second action term with an attribute of the entity may be performed. Alternatively, the operation may increase the amount of evidential support for the value of the attribute of the entity obtained from the "post-condition" feature of the previous action term, e.g., the post-condition feature of the action term melt indicated that butter is a liquid and the subsequent action term, having a matching state of matter attribute on its pre-condition feature, provides further evidence that butter is a liquid and hence, the evidential scoring data is increased. If the results feature does not match the pre-condition feature of the next action term, then the processing for this entity with regard to this document may be discontinued as each subsequent action item is likely incorrect due to the temporal nature of the actions. This process may continue throughout the document and thus, a plurality of action term instances within a single document may contribute knowledge with regard to the attributes of an entity, rather than being limited to the first such occurrence of an action term.

As discussed hereafter with regard to one or more illustrative embodiments, this process of traversing the action terms in the temporally ordered listing of action terms for an entity may be utilized to identify errors in a document, errors in responses from human users, or the like. The identified errors may be correlated with corrections or instructions to correct the content of the documents or instruct a human being or automated system with regard to the correct temporal ordering of actions to be performed on an entity with regard to the particular objective that is to be achieved, e.g., preparing a recipe, manufacturing an object, performing a laboratory test, or the like. These corrections or instructions may be based on the knowledge present in the expanded ontology or knowledge base generated by way of the mechanisms of the illustrative embodiments, e.g., if a user being monitored or trained indicates that they are going to pour the butter, or a recipe being analyzed indicates that the next step is to pour the butter, yet there is no indication that the butter has been previously melted, then an error may be identified and a corresponding correction or instruction indicating that the butter should be melted or otherwise converted into a liquid state of matter will be output. Similarly, if a human being, document, or automated system indicates to "grate" the "cottage cheese," it can be determined from the attributes of cottage cheese and the pre-condition features that there is a mismatch between the constraint requirements for the action term "grate" and the attributes of "cottage cheese" and the source of the input, e.g. human being, document, or automated system, may be informed of this error.

Thus, in a first aspect of the illustrative embodiments, the mechanisms of the illustrative embodiments provide for automated learning based on a relatively small set of annotated terms, e.g., action terms or verbs, in which the terms are annotated with pre-condition feature information specifying a requirement of an attribute of an entity upon which the action corresponding to the action term may be performed. Moreover, the terms may optionally be annotated with post-condition feature information indicating what results from the action corresponding to the action term being performed on an entity meeting the constraint of the pre-condition feature. This relatively small set of annotated terms are then used as a bootstrapping mechanism for gathering knowledge about the attributes of entities in an ontology or knowledge base through inference obtained from the usage of the annotated terms in natural language content in documents or portions of documents of a domain specific corpus. The expanded knowledge base or ontology may then be used to perform cognitive operations with a greater amount of knowledge being made available for use by the cognitive operations.

This benefit is obtained through an automated process which greatly reduces human effort when representing knowledge about entities in an ontology. For example, in a cooking domain, there may be 4000 ingredients, represented by entity data structures in a knowledge based or an ontology data structure, which may be utilized by a cognitive system, such as IBM Chef Watson™, for example. However, there may be a relatively small number of actions, and their corresponding action terms, that can be performed on these ingredients, e.g., 200 action terms and their synonyms corresponding to these actions, e.g., 300 synonyms, that can be performed on ingredients, e.g., "chop," "cut," "grate", "drizzle," "pour", etc. It takes considerably less time to annotate the 200 action terms with regard to pre-condition features and optional post-condition features, than it does to annotate the various attributes of each of the 4000 ingredients, where there may be many more attributes of an ingredient than the number of features annotated for the action terms. A greater time savings is also achieved since of the 500 action terms, a smaller subset, e.g., the 200 original action terms, may only need to be annotated while other terms that are synonyms, e.g., the 300 synonym terms, may need to only be mapped to the annotated terms through synonym data structures of dictionaries. With the mechanisms of the illustrative embodiments, the relatively small set of annotated action terms are used to learn the correct values for the attributes of the much larger set of ingredients based on the inference mechanisms of the automated learning process previously described above.

In addition to this first aspect, the illustrative embodiments, in a second aspect, provide for an automated training/testing system that provides user feedback and/or question and answer generation for training/testing human beings regarding how to perform operations that comprise a series of ordered tasks, where the attributes of an entity influence which tasks in the series can be performed on the entity. For example, the training/testing system of these illustrative embodiments may be used, again using the cooking domain as an example, to train a chef to prepare a recipe where the chef is questioned as to the steps of the recipe and the correctness of those answers is determined based on the current attributes of the ingredients. For example, the training/testing system may monitor the actions of a human being, the responses to questions presented to a human being, or may simply output an ordered set of instructions to a human being. The monitoring of the human being may be performed through multi-media monitoring mechanisms, such as video monitoring equipment and image analysis that correlates captured images with actions being performed by a human being on a recognized entity identified through image recognition (e.g. an image of a human cutting an apple, or pouring a liquid, etc.), audio response monitoring which may convert audio input to textual form which may then be processed using the mechanisms of the illustrative embodiments, or the like. Responses to questions may be performed through a prompt/response type of interface where the person is prompted by a question and a corresponding answer is returned or selected from a predefined listing of potential answers. This may be done using any visual or audible mechanism including traditional computing system input/output devices, voice recognition mechanisms, and/or the like.

In one example, assume that the training/testing system has acquired the knowledge, using the mechanisms of the illustrative embodiments, that butter may be a solid, butter may be a liquid, and solid butter may be melted to generate liquid butter. If the training/testing system is testing a person regarding the correct steps for performing a recipe in which butter is utilized, if the chef states that the next step of the recipe is to pour the butter, but the chef has not melted the butter yet, then the system would return a result that the answer is incorrect and may present the reason for the answer being incorrect, as well as a correct response that the person should have provided. All of this may be determined from application of the knowledge obtained through the automated learning process using the bootstrapped annotated set of action terms as discussed above, for example. Moreover, a similar analysis as presented above for expanding the knowledge base automatically, may be used to evaluate the current state of the entity within the scope of the objective attempting to be performed and determining the correctness of an action on the entity based on its current state, previous state, the post-condition feature of the previous action performed on the entity, and the pre-condition feature of the action that the human being is attempting to perform on the entity or the action indicated in the human being's response.

As noted above, such illustrative embodiments may be applied to any domain where there are ordered tasks that must be followed to complete an operation, and in which the temporal state of an entity influences or constrains the types of actions that may be performed on the entity. Thus, while the illustrative embodiments are described in the context of a cooking domain and the IBM Chef Watson™ cognitive system being used as a basis for performing cognitive operations, the illustrative embodiments are not limited to such. Rather, the mechanisms of the illustrative embodiments may be applied to other domains such as manufacturing, medical analysis (such as in the case of laboratory tests or experiments), scientific experimentation, criminal forensic science investigations, legal domains where the entities may be legal entities, or the like. Those of ordinary skill in the art will recognize the plethora of other applications of the mechanisms of the illustrative embodiments to various domains in view of the description set forth herein and any such implementation of the illustrative embodiments is intended to be within the spirit and scope of the present invention.

In a third aspect, the illustrative embodiments provide mechanisms for performing automatic insertion or correction of an ordered set of tasks for completing an operation or achieving an objective in a particular domain. The insertion/correction may be performed, in some illustrative embodiments, to augment or otherwise complete an already existing set of tasks or instructions for performing tasks. For example, again using the cooking domain as an example, a recipe may be provided that has missing or incorrect instructions. The mechanisms of the illustrative embodiments may be implemented to verify the entity/action pair correctness and thereby determine if there are missing instructions in the recipe and what the nature of those missing instructions may be with regard to correction entity/action pairs. As a simple example, consider a recipe that calls for the pouring of butter into a mixture. The recipe may not previously have had an instruction to melt the butter prior to the pouring instruction.

Thus, the mechanisms of the illustrative embodiments may parse the recipe and generate a temporally ordered action list for each entity in the recipe. The temporal state of the corresponding entity may be tracked by traversing the action terms in the temporally ordered action list, e.g., the butter is first melted and thus, the state of the butter went from solid to liquid, the butter was then poured into a mixture and thus, the state of the butter is a mixture state (which may indicate that actions to the butter by itself can no longer be performed and thus, subsequent actions that do not reference the mixture and instead reference the butter may be erroneous). The temporally ordered action list may be processed to determine if there are any mismatches between pre-condition features of action terms and the then temporal state of the entity.

If there are mismatches, then it may be determined that there is a missing instruction or set of instructions in the recipe. For example, assume that a first action term indicates that the butter has been divided meaning that the butter was initially in a solid state and is rendered into a divided solid state. The next action term in the temporally ordered action term listing may indicate that the butter is to be poured into a mixture. The pre-condition feature of the action term "pour" requires a liquid entity, e.g., a liquid form of an ingredient, however by tracking the temporal state of the entity, it is determined that the current state of the butter entity is a divided solid. As a result, a mismatch is identified between the pre-condition feature of the action term and the current state of the entity. The error may be noted and a corresponding notification generated. In some illustrative embodiments, the detection of this mismatch or error indicates missing instructions and an instruction knowledge base may be searched for instructions that result in the required attribute for the entity required by the pre-condition feature of the action term, e.g., an instruction that results in liquid butter for use with a subsequent action term that requires liquid butter as part of its pre-condition feature.

Thereafter, the set of instructions may be automatically corrected or updated to include any missing instructions required to provide the entity with the required attribute value. Of course, additional cognitive operations may be performed to ensure compatibility of the discovered instructions with the other instructions present in the existing listing of instructions and with common sense knowledge. For example, using only the instructions themselves, the instruction "grate the cottage cheese" may be corrected by inserting an additional prior instruction to "freeze the cottage cheese" (this would make the cottage cheese solid) and then "grate the cottage cheese". However including common sense knowledge may indicate that "freezing cottage cheese" might not be a good idea as cottage cheese is generally not frozen.

The addition of instructions based on common sense knowledge, e.g., in a recipe, set of manufacturing instructions, or the like, may be evaluated based on various knowledge sources. For example, the IBM Chef Watson™ cognitive system comprises cognitive logic for identifying certain compatibilities of ingredients based on their texture, color, taste, and the like, which may be taken into consideration when evaluating the inclusion of new instructions to address the instruction gaps or mismatches found via the mechanisms of the illustrative embodiments.

Similarly, at each stage of checking the pre-condition features of an action and the current state of the entity, it may also be determined whether an action term requires a certain attribute of the entity and whether or not the entity can or cannot have that value of the attribute, e.g., none of the values for the attribute exist in association with the entity, then an error may be identified. For example, if it is determined that an action term has a pre-condition feature that the entity must be in liquid form, e.g., the action term "pour", but none of the state of matter attribute values for the entity allow for a liquid state of matter, then an error is determined for which no missing instructions can be provided. In such a case, the error may simply be used to generate a notification of an uncorrectable error.

In a more complex example, it may be determined that there is an inconsistency between an entity's current state in a temporal listing of action terms of the existing recipe with regard to an entity, e.g., the recipe states to whip the potatoes, however the potatoes have not been previously rendered into a "whippable" form, e.g., by converting them to a liquid or mixture state, which may require a series of operations, such as chopping the potatoes and cooking them to render them into a "softened" state which can be "whipped".

A knowledge base of instructions may be searched based on the entity and a desired state, as determined from the pre-condition feature of the action term. Thus, for example, if the entity is potatoes and the action term is "whip" and the constraint on the action term is "liquid" or "mixture" state, then the knowledge base of instructions may be searched for entries that result in a liquid or mixture state of potatoes, e.g., "chop the potatoes into small pieces and add the butter and the sour cream." Corresponding features of these instructions may be retrieved as well, such as ingredient listings and amounts of ingredients, which can then be used to add to the existing recipe that is being modified to include the missing instructions.

In some illustrative embodiments, the identification of instruction gaps or missing instructions may be used to generate instruction sets for automated systems and/or devices, such as automated cooking systems/devices, automated manufacturing systems/devices, automated laboratory test systems/devices, and the like. In some illustrative embodiments, these instructions are provided to robotic devices that perform actions on entities in accordance with the provided instructions.

For example, a robotic system or device may be provided with an initial sparsely populated set of instructions to achieve a desired objective, e.g., generate a food item according to a recipe, generate an object according to a set of manufacturing instructions, perform a specific test on an entity based on a set of instructions, or the like. Based on this sparsely populated set of instructions, a dynamic determination of the missing intervening instructions, corresponding to the instruction gaps, may be automatically performed and corresponding instructions for filling the gaps may be automatically generated or selected based on analysis of the attributes of entities and recognizable action terms in the sparsely populated set of instructions. The mechanisms of the illustrative embodiments thus, "fill in the blanks" and provide the necessary additional instructions to instruct the automated system to perform the missing operations to achieve the desired result.

Thus, the illustrative embodiments provide a mechanisms for expanding the knowledge base or ontology that is used to perform cognitive operations. The illustrative embodiments may further provide mechanisms for training/testing of human being with regard to an operation comprising a temporally ordered series of tasks. Furthermore, the illustrative embodiments provide mechanisms for automatically correcting or augmenting a set of instructions which may be present in a document, in a set of instructions being provided to a human being, a set of instructions being provided to an automated system, or the like. All of these mechanisms utilize a bootstrapping mechanism that allows for a large expanse of knowledge to be automatically generated and utilized based on an initial relatively small set of manually annotated terms specifying constraints on entities.

Before beginning the discussion of the various aspects of the illustrative embodiments in more detail, it should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the present description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for implementing an automated bootstrap based learning process to expand a knowledge base or ontology and utilizing that knowledge base or ontology to perform cognitive operations. These cognitive operations, in some illustrative embodiments, may involve training/testing of human beings with regard to a process comprising a series of tasks to generate a desired objective or result, the automated correction/augmenting of sets of instructions, the generation of instruction sets for automated systems/devices, and the like. In some cases, multi-media monitoring of human beings and/or automated systems may be performed dynamically with dynamic response from the cognitive system to correct actions being taken by the human being/automated system. Various other types of cognitive operations may also be implemented without departing from the spirit and scope of the present invention.

Figure 2:
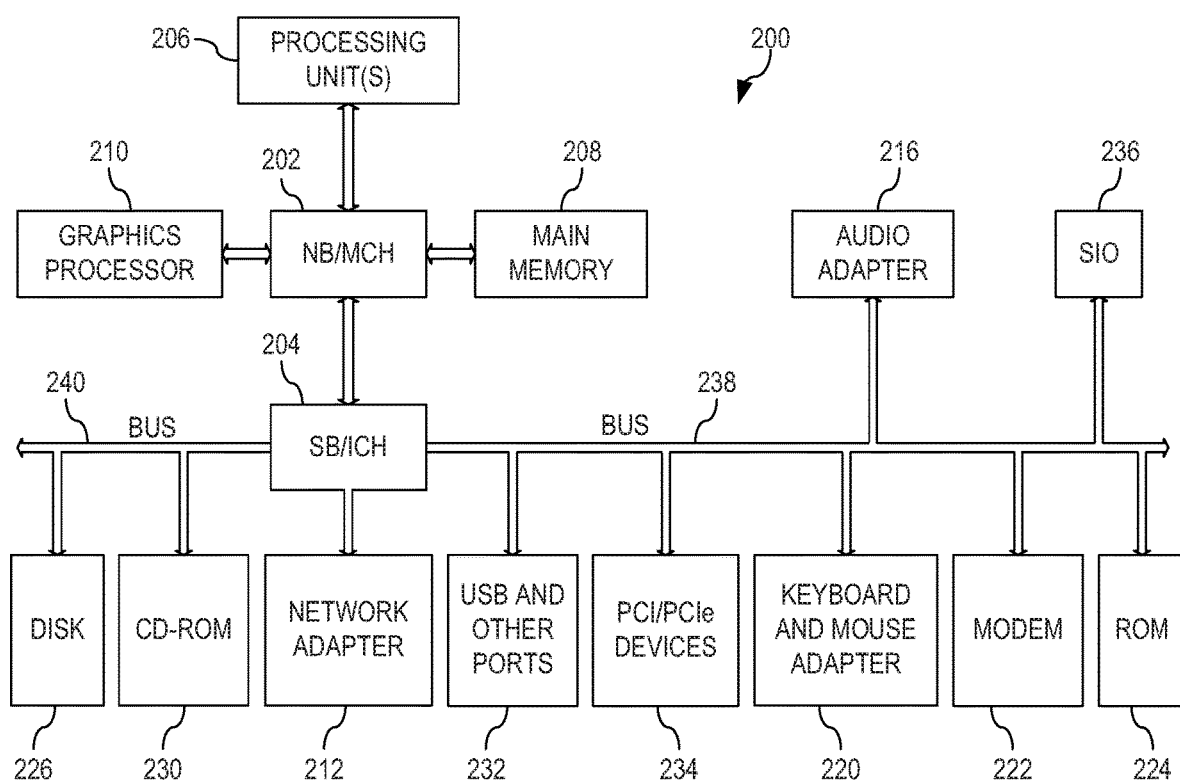
FIG. 2 is a block diagram of an example data processing system in which aspects of the illustrative embodiments are implemented.
Figure 3:
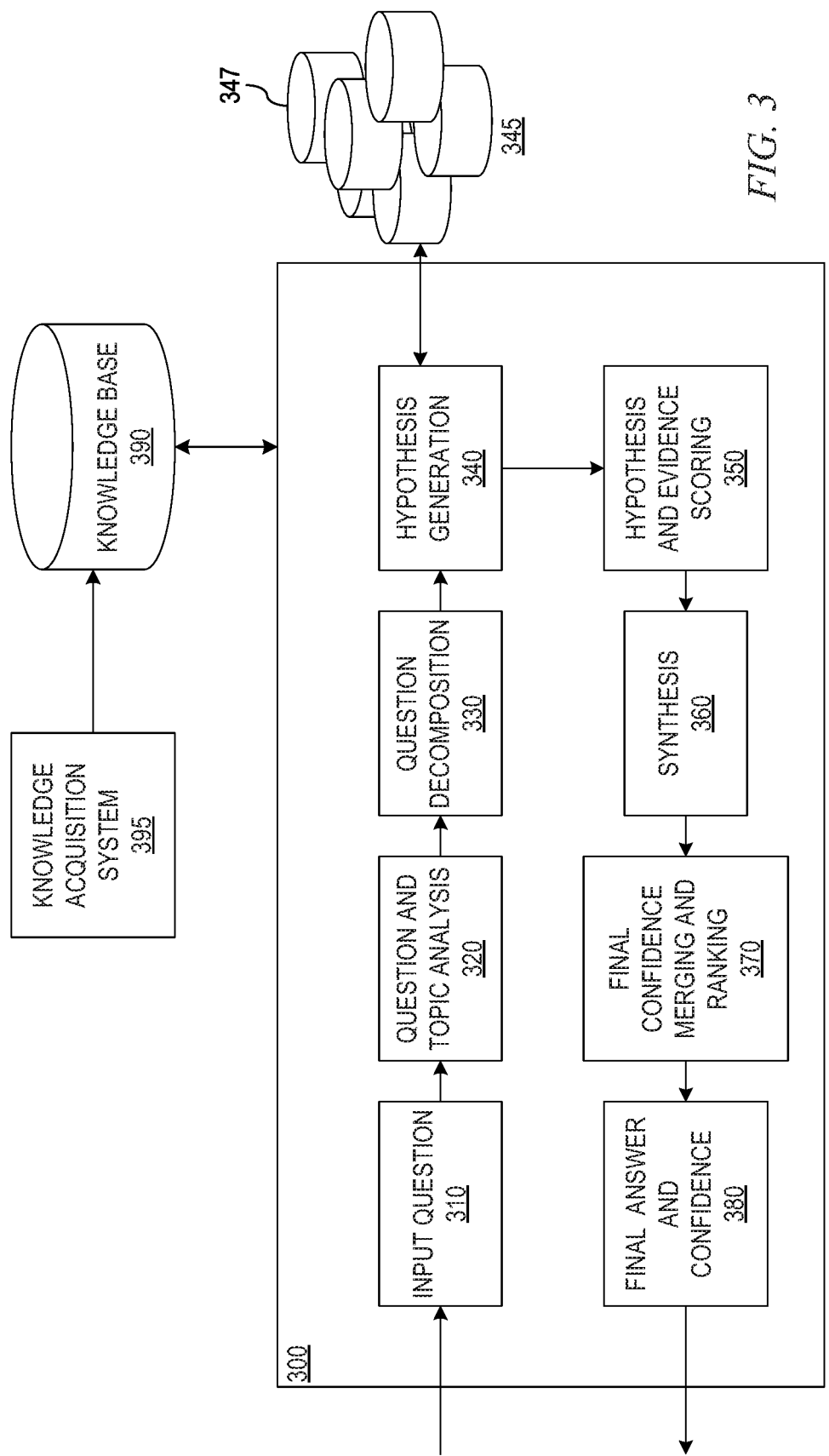
FIG. 3 illustrates an example of a cognitive system processing pipeline which, in the depicted example, is a question and answer (QA) system pipeline used to process an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system for performing a cognitive operation based on knowledge gathered through a bootstrapped automated learning process in accordance with the illustrative embodiments. In the depicted example, the cognitive system implements a request processing pipeline, such as a Question Answering (QA) pipeline (also referred to as a Question/ Answer pipeline or Question and Answer pipeline) for example, request processing methodology, and request processing computer program product with which the mechanisms of the illustrative embodiments are implemented. These requests may be provided as structure or unstructured request messages, natural language questions, or any other suitable format for requesting an operation to be performed by the cognitive system. As described in more detail hereafter, the particular application that is implemented in the cognitive system of the present invention is an application for evaluating an ordered set of tasks performed on, with, or to, entities, where the tasks and entities are domain specific and the form of the specification of these ordered sets of tasks is also implementation specific, e.g., electronic documents, monitored actions from monitoring equipment, or the like.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a generating/correcting, or otherwise providing cooking recipes. In other cases, for example, the request processing pipelines may be configured to provide different types of cognitive functions or support different types of applications, such as one request processing pipeline being used for evaluating the performance of operations for generating a food item based on a cooking recipe, training/testing a human being regarding the performance of operations to generate such a food item based on a cooking recipe, identifying instruction gaps and automatically filling in those gaps with appropriate instructions, etc.

Moreover, each request processing pipeline may have their own associated corpus or corpora that they ingest and operate on, e.g., one corpus for cooking domain documents (e.g., comprising recipes and information specifying ingredients and/or actions associated with the cooking domain), another corpus for manufacturing domain related documents for manufacturing a specific object, a third corpus for medical laboratory test domain related documents, etc. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What is a recipe for making a raspberry cheesecake?", the cognitive system may instead receive a request of "generate a recipe for making a raspberry cheesecake," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms of a cognitive system with regard to performing automated bootstrapped learning of attributes of entities in a knowledge base or ontology. The automated mechanisms utilize an inference based learning methodology to expand the knowledge base and ontology as outlined above and discussed hereafter. The automatically expanded knowledge base or ontology may then be used to perform a cognitive operation.

Thus, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding
Ingest and process vast amounts of structured and unstructured data
Generate and evaluate hypothesis
Weigh and evaluate responses that are based only on relevant evidence
Provide situation-specific advice, insights, and guidance
Improve knowledge and learn with each iteration and interaction through machine learning processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection from data points (images, text, voice) (memorization and recall)
Predict and sense with situational awareness that mimic human cognition based on experiences
Answer questions based on natural language and specific evidence In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104A-D (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-D.

The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables question processing and answer generation (QA) functionality for one or more cognitive system users via their respective computing devices 110-112. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, or the like. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-D on the network 102 include access points for content creators and cognitive system users. Some of the computing devices 104A-D include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions/requests to the cognitive system 100 that are answered/processed based on the content in the corpus or corpora of data 106. In one embodiment, the questions/requests are formed using natural language. The cognitive system 100 parses and interprets the question/request via a pipeline 108, and provides a response to the cognitive system user, e.g., cognitive system user 110, containing one or more answers to the question posed, response to the request, results of processing the request, or the like. In some embodiments, the cognitive system 100 provides a response to users in a ranked list of candidate answers/responses while in other illustrative embodiments, the cognitive system 100 provides a single final answer/response or a combination of a final answer/response and ranked listing of other candidate answers/responses.

The cognitive system 100 implements the pipeline 108 which comprises a plurality of stages for processing an input question/request based on information obtained from the corpus or corpora of data 106. The pipeline 108 generates answers/responses for the input question or request based on the processing of the input question/request and the corpus or corpora of data 106. The pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 106. Based on the application of the queries to the corpus or corpora of data 106, a set of hypotheses, or candidate answers/responses to the input question/request, are generated by looking across the corpus or corpora of data 106 for portions of the corpus or corpora of data 106 (hereafter referred to simply as the corpus 106) that have some potential for containing a valuable response to the input question/response (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer is inferred by the question. This process is be repeated for each of the candidate answers to generate ranked listing of candidate answers which may then be presented to the user that submitted the input question, e.g., a user of client computing device 110, or from which a final answer is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in Yuan et al., "Watson™ and Healthcare," IBM developerWorks, 2011 and "The Era of Cognitive Systems: An Inside Look at IBM Watson™ and How it Works" by Rob High, IBM Redbooks, 2012.

As noted above, while the input to the cognitive system 100 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. In the case of a cooking domain implementation, for example, the request may be to train/test a human being to perform tasks for generating a food item corresponding to a recipe, to generate a recipe, or the like, such that the analysis performed may be with regard to recipe instructions, ingredient attributes, and action term features, for example.

In the context of the present invention, cognitive system 100 may provide a cognitive functionality for providing an ordered set of tasks for generating a desired result or achieving a particular objective. In the context of a cognitive system such as IBM Chef Watson™, for example, the cognitive functionality may be the generation of recipes, correction or augmentation of recipes, the training/testing of human beings with regard to recipe preparation, dynamic feedback based on dynamically obtained information about actions of human beings or automated systems to perform actions to prepare a recipe, or the like. The cognitive functionality may make use of the automated bootstrapped learning process mechanisms of the illustrative embodiments to perform such cognitive operations.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a knowledge acquisition system 150 which performs operations for automatically expanding a knowledge base 160 comprising ontology 162 based on an automated bootstrap based learning process. That is, as noted above, the knowledge acquisition system 150 comprises bootstrap learning process logic 152 and configuration data structures 154 which operate on seed action term input 170 and domain specific attribute learning configuration data structures 175 to expand the knowledge base 160, e.g., ontology 162 in knowledge base 160, based on processing of documents in a domain specific corpus 106.

The knowledge acquisition system 150 may utilize language processing resources 156 and natural language processing (NLP) logic 158 to analyze the documents of a domain specific corpus 106 to extract the information needed to perform the bootstrap learning process. While FIG. 1 shows these resources 156 and NLP logic 158 as separate from the cognitive system pipeline 108, in some illustrative embodiments, the bootstrap learning process logic 152 may utilize the already provided logic and resources available in the cognitive system 100 and/or pipeline 108 to perform its bootstrap learning process.

Based on the results of the processing of the documents in the corpus 106, the expanded knowledge base 160 may be provided to the cognitive system 100 for use in performing its cognitive operations. More specifically, the pipeline 108 of the cognitive system 100 may utilize the knowledge base 160 and/or ontology 162 as a basis for evaluating an input request or question and generate a corresponding response/answer.

As noted above, the bootstrap learning process logic 152 of the knowledge acquisition system 150 performs a learning process for bootstrapping a small amount of manually acquired domain knowledge, such as specified in the seed action terms 170, to automatically build a much larger set of domain knowledge, such as in the knowledge base 160 and/or ontology 162, where the knowledge acquired is inferred from documents of a corpus 106 based on the usage constraints of the seed action terms 170 and their instances of being performed on domain specific entities in the documents of the corpus 106. In the example implementations, these relationships are entity/action pairs where the entities are expressed in natural language content of the documents in corpus 106 as nouns, while the actions are represented in the natural language content as verbs, thus an entity/action pair may also be represented as noun/verb pairs.

It should be appreciated that the seed action terms data structure 170 comprises a relatively small set of terms than represents entities in the knowledge base 160 and/or ontology 162, e.g., 500 terms in the seed action terms data structure 170 as opposed to over 4000 terms representing entities in the knowledge base 160 and/or ontology 162. Moreover, the action terms specified in the seed action terms data structure 170 may be manually tagged with features that indicate constraints on the attributes of entities with which that corresponding action may be utilized, i.e. pre-condition features. In some illustrative embodiments, the seed action terms may also be manually tagged with features that indicate the result of the operation of the corresponding action on an entity that satisfies the constraint requirement, i.e. post-condition features. For example, in a cooking domain, the seed action terms 170 may represent actions that can be performed on ingredients, or combinations of ingredients. The action terms corresponding to these actions may be manually tagged with pre-condition features specifying a state of matter attribute constraint for the entities upon which the corresponding action may be performed, and post-condition features indicating a state of matter attribute that results from the operation of the action on an entity satisfying a corresponding pre-condition feature.

In addition to the seed action terms data structure 170, a domain specific attribute learning configuration data structure 175 may be manually specified. The domain specific attribute learning configuration data structure 175 specifies one or more attributes of entities that are to be learned by an automated bootstrap learning process implemented by the knowledge acquisition system 150. For example, the domain specific attribute learning configuration data structure 175 may specify that the bootstrap learning process logic 152 of the knowledge acquisition system 150 is to operate to learn a state of matter attribute of entities in the knowledge base 160 and/or ontology 162, for example.

The relatively small set of action terms in the seed action terms data structure 170, as well as the domain specific attribute learning configuration data structure 175 specifying the attributes for the entities that are to be learned, are input to the knowledge acquisition system 150 to thereby configure the knowledge acquisition system 150 to perform automated bootstrap based learning of domain specific attributes for entities in the knowledge base 160 and/or ontology 162. This configuration may be stored in configuration data structure(s) 154. The configuration data structure(s) 154 may also store other configuration parameters and data which may be required by the knowledge acquisition system 150 and/or bootstrap learning process logic 152 to perform automated bootstrap based learning of the specified attribute(s) in the domain specific attribute learning configuration data structure 175. For example, these configuration data structure(s) 154 may specify one or more threshold confidence scores against which evidence based confidence score values generated for various values of the attribute may be compared to determine which values of the attribute to maintain in association with the entities.

The knowledge acquisition system 150 further receives as input a knowledge base 160 and/or ontology 162 that specifies the entities with which the bootstrap learning process logic 152 operates and for which the attributes specified in the domain specific attribute learning configuration data structure 175 are to be learned. The generation of ontologies of entities or knowledge bases of entities is generally known in the art and thus, a more detailed description is not provided herein. In general, the knowledge base 160 and/or ontology 162 comprises data structures for entities and specifies relationships between these entities, such as in the form of a directed acyclic graph or other such hierarchical and/or relational data structure. The knowledge base 160 or ontology 162 may be manually, automatically, or semi-automatically generated and operates as a seed set of entities for which knowledge is to be acquired by the knowledge acquisition system 150. The knowledge base 160 and/or ontology 162 may also serve as a basis upon which the cognitive system 100 performs its cognitive operations once expanded by the mechanisms of the illustrative embodiments.

With the seed action terms data structure 170 specifying the seed action terms and their constraint/post-condition features, the domain specific attribute learning configuration data structure 175 specifying the attribute(s) to be learned for the entities, the knowledge base 160 and/or ontology 162 providing the recognized entities for which the attribute(s) are to be learned, and the configuration data structure(s) 154 specifying configuration parameters for the bootstrap learning process logic 152 of the knowledge acquisition system 150, the knowledge acquisition system 150 processes documents of a corpus 106 to generate the attribute values for the entities in the knowledge base 160 and/or ontology 162 via an automated bootstrap based learning process implemented by the logic 152. This automated learning involves the use of natural language processing logic 158 operating on the natural language content of the documents in the domain specific corpus 106, using domain specific natural language processing resources 156. These domain specific natural language processing resources 156 may comprise any resources needed to facilitate natural language processing on natural language content and may include, but is not limited to, dictionaries, synonym mapping data structures, named entity identification resources, and the like. The natural language processing logic 158 extracts elements from the natural language content of documents of the corpus 106 which may include key terms and/or phrases associated with domain specific entities and actions, such as may correspond to action terms in the seed action terms data structure 170 and entities in the knowledge base 160 and/or ontology 162.

In accordance with the illustrative embodiments, using a single document of the corpus 106 as an example, the natural language processing logic 158 analyzes the natural language content of a document and provides the extracted elements to the bootstrap learning process logic 152 preserving the order in which these elements appear in the document. The bootstrap learning process logic 152 operates to infer the attributes of entities by observing the use of the action terms in conjunction with the entities in the natural language content, e.g., a particular ingredient is an argument of that action term, with the inferred attributes of entities being generated from the analysis of the usage of action terms in conjunction with an entity term for the entity and the pre-condition features associated with those action terms. The resulting values for the attribute may then be added to an entry for the entity in the knowledge base 160 and/or ontology 162, such as by populating a value in an attribute field of the entity entry. In this way, the knowledge base 160 and/or ontology 162 for the cognitive system 100 is automatically expanded through cognitive analysis of natural language content of documents in the corpus 106 using a small initial set of tagged action terms 170.

For example, the bootstrap learning process logic 152 may arrange the recognized action terms, associated with an entity specified in the knowledge base 160 and/or ontology 162, found in the natural language content of the document (via the natural language processing performed by logic 158), into a correct temporal ordering to thereby generate a temporally ordered action term listing associated with the entity. As noted above, this temporal ordering may be based on the ordering in which the action terms appear in the document, an ordering based on more complex analysis of temporal terms set forth in the natural language content of the document, or the like. This process may be performed for a plurality of entities referenced in the document such that a separate temporally ordered action term listing is generated for each identified entity.

With the action terms associated with an entity having been ordered according to temporal characteristics, the first action term that operates on or references the entity of interest is identified by the bootstrap learning process logic 152 automated learning process which assumes that the entity of interest satisfies the pre-condition features of the first action term that operates on the entity in the temporally ordered action term listing. The pre-condition feature of the first action term is then applied to the entity as a value of the corresponding attribute of the entity, i.e. the entity is now recognized as having the value associated with the attribute corresponding to the pre-condition feature, e.g., if the pre-condition feature requires a solid entity, then the value of a state of matter attribute of the entity is set to a "solid" value.

In one illustrative embodiment, this process is done with regard to each document and each entity referenced by each document in the corpus 106. Thus, for each entity referenced in the corpus 106 a value of an attribute may be learned. In other illustrative embodiments, the bootstrap learning process logic 152 may maintain an attribute value tracking data structure 156 for each value of the attribute to be learned for each entity. For example, if the attribute to be learned is a state of matter attribute, then for each entity the various values encountered for this attribute through processing of the documents may be stored in an attribute value tracking data structure 156. In addition, a count of each time the value is encountered for this attribute across all of the documents of the corpus 106 may be maintained. Based on these counts, a confidence score may be calculated for each value of the attribute and compared to a threshold value by the bootstrap learning process logic 152. The threshold value may be a confidence score threshold specified in the configuration data structure 154, for example. Those values for the attribute that meet the requirements of the threshold may be maintained in the knowledge base 160 and/or ontology 162 while others that do not may be discarded.

In addition, the bootstrap learning process logic 152 may generalize the newly learned attribute values for the entity up a domain specific subsumption hierarchy of the knowledge base 160 and/or ontology 162, so that the attribute values may be associated with other entities and concepts in the hierarchy of the knowledge base 160 and/or ontology. This propagated knowledge may then be used to reason about other entities in the knowledge base 160 and/or ontology based on the relationships associated with the entities specified therein.

The result of this automated learning process is an expanded knowledge base 160 and/or ontology 162 that is expanded with regard to the attributes of the entities for the specific domain. The expanded knowledge base may then be utilized as input to the cognitive system 100 to perform various cognitive operations including, but not limited to, performing question answering or responding to requests for information, correction of natural language documents or text, expanding upon the content of a natural language document, training/testing of human users, automatic generation of instructions or commands for controlling the operation of an automated system or device, performing monitoring of human actions or interactions with entities and providing constructive feedback or instruction, and/or the like.

As noted previously, in some illustrative embodiments in which post-condition features are associated with action terms in the seed action terms data structure 170, the process of learning values for attributes of an entity does not stop at the first action term in the document referencing the entity. To the contrary, in further illustrative embodiments, the temporally ordered action term listing may be followed with veracity checks of the pre-condition features of each action term being performed with regard to the value of the attributed generated by the temporally previous action term in the temporally ordered action term listing. For each action term in the temporally ordered action term listing where the veracity check succeeds, additional evidential support for a value of the attribute is identified and maintained in the attribute value tracking data structure and/or a new value of the attribute is recorded in association with the entity. If an action term's pre-condition feature is not satisfied by the value of the attribute specified in the "post-condition" feature of a previous action term, then the processing of action terms in the temporally ordered action term listing data structure 156 for this entity and this document is discontinued.

The cognitive system 100 operates on the expanded knowledge base 160 and/or ontology 162 to perform a cognitive operation, which may employ the use of pipeline 108, for example. In one illustrative embodiment, the cognitive system 100 operates to identify errors in a document, such as a document present in the corpus 106 or another corpus upon which the learning of attributes of entities was not based. For example, the corpus 106 may represent an initial set of recipes in a cooking domain upon which the knowledge acquisition system 150 operates to automatically learn the attribute values for a plurality of ingredients. Thereafter, the operation of the cognitive system 100 may be performed with regard to new recipes that are not present in the corpus 106. These new recipes may be those that are to be added to the corpus 106 for example, generated by an automated system, such as the IBM Chef Watson™ automated recipe system available from IBM Corporation of Armonk, N.Y., or the like. The new recipes are processed for correctness prior to addition to the corpus 106. In other illustrative embodiments, these recipes may be those that are supplied by users, such as via client computing devices 110, 112, or server computing devices 104B-104D, and for which a request is received to verify the correctness of the recipe. For example, a document may be provided that includes recipes and the cognitive system 100 may apply the knowledge in the knowledge base 160 and/or ontology to the recipe as well as the pre-condition features associated with action terms to determine the correctness of the recipes. In some illustrative embodiments, the input of the recipe may be in terms of responses from human users to prompts from the cognitive system 100. The identified errors may be correlated with corrections or instructions to correct the content of the documents or instruct a human being or automated system with regard to the correct temporal ordering of actions to be performed on an entity with regard to the particular objective that is to be achieved, e.g., preparing a recipe, manufacturing an object, performing a laboratory test, or the like.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8°. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p° computer system, running the Advanced Interactive Executive) (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 3 is provided only as one example of the processing structure that may be implemented to process a natural language input requesting the operation of a cognitive system to present a response or result to the natural language input.

The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the pipeline 300 operates in conjunction with a knowledge base 390 that is, at least in part, generated by the knowledge acquisition system 395 through an automated bootstrap learning process based on a relatively small set of manually tagged action terms that can be used to infer the values of attributes for entities in the knowledge base 390 and thereby expand an initial knowledge base into the knowledge base 390 used by the pipeline 300. The pipeline 108 may utilize the knowledge base 390 as part of the evidence or information for generating hypotheses, or candidate answers, and/or evaluating evidential support for hypotheses or candidate answers. In other illustrative embodiments, the pipeline may process natural language content for determining errors in the natural language content, missing content, or the like, and generating corrections for the errors, the missing content, or the like.

Thus, with the mechanism of the illustrative embodiments, automated bootstrap based learning is performed with regard to domain specific attributes of domain specific entities based on a small seed set of domain specific action terms. The illustrative embodiments alleviate the human effort required to generate comprehensive domain specific knowledge bases or ontologies and reduces the likelihood of human error being introduced into the knowledge base or ontology.

As noted above, in some illustrative embodiments, the cognitive system is implemented in a cooking domain and provides cognitive logic to perform cognitive operations with regard to the generation, evaluation, and preparation of recipes. As such, the illustrative embodiments may be utilized to expand a cooking domain knowledge base including entities which are ingredients of recipes and the relationships between such entities, e.g., hierarchical representations of categories of entities such as an entity for "root vegetables" with child entities being "potatoes," "onions," "turnips," etc. The expansion of the cooking domain knowledge base of ingredients may be performed by using a small set of manually tagged action terms, evaluating recipes in which such action terms and references to entities of the knowledge base are present, and identifying values for attributes of the entities from the pre-condition features associated with the action terms.

To illustrate this process further consider the example recipe shown in FIG. 4. Assume with regard to this recipe example, that the knowledge acquisition system 150 is attempting to learn a state of matter attribute of ingredients in a knowledge base, where the particular values of a state of matter attribute may be specified as a particular set of recognized values, e.g., solid, liquid, particulate, mixture, etc. Since the cooking domain is largely imperative, the automated bootstrap learning process is primarily interested in the direct object of an action term. Thus, action terms may be defined such as "cut", "stir", "sift", "boil", "melt", "grate", and the like. Each of these action terms may have a pre-condition feature and a "post-condition" feature defined manually for those action terms, such as by a human subject matter expert. An example correlation of action term with features may be as follows:

TABLE 1

Example of Action Terms and Features

| Action Term | Pre-condition Feature | Post-condition Feature |
|---|---|---|
| Cut | Solid | Solid |
| Stir | Not Solid | Not Solid |
| Sift | Particulate | Particulate |
| Boil | Liquid | Not Solid |
| Melt | Solid | Liquid |
| Grate | Solid | Particulate |

It should be appreciated that in addition to the mapping of action terms with pre-condition features and post-condition features, natural language processing resources, such as synonym dictionaries or mapping data structures that map synonyms to the action terms, may be defined and used by natural language processing logic when processing input natural language content, such as in electronic documents or portions of electronic documents.

Assuming that a document comprising the recipe in FIG. 4 is received as input upon which the mechanisms of the illustrative embodiments are to operate, the recipe is parsed and analyzed with natural language processing logic to extract instances of recognizable action terms which are then mapped to the corresponding pre-condition features and post-condition features. In addition, the object of the action terms may be identified via the natural language processing to thereby identify the entities for which attributes may be learned from the action terms. It should be appreciated that synonyms may be identified through the natural language processing and mapped to the action terms having their pre-condition and post-condition features defined.

For each identified entity, a temporally ordered action term listing is generated. Thus, for example, with regard to the recipe of FIG. 4, a temporally ordered action term listing for the ingredient butter may be obtained as follows: Melt and then Drizzle. The first action term that modifies the entity "butter" is identified, i.e. melt, has a pre-condition feature of "solid" (see Table 1 above). The pre-condition feature of the first action term in the temporally ordered action term listing for the entity "butter" is transferred to the entity as a value for the attribute being learned, e.g., state of matter attribute=solid. Similarly, the action term "chop" in the recipe of FIG. 4 is a synonym for "cut" and therefore, the pre-condition feature of "cut" may be transferred to the state of matter attribute for the ingredient entity of "onions," thereby indicating that onions are solid. Likewise, the action term "whisk" is a synonym for "stir" and thus, the pre-condition feature of "stir" may be transferred to the ingredient entity "milk" thereby indicating that milk is "not solid."

The temporally ordered action terms in the listing for an entity may be traversed to ensure that each subsequent action term's pre-condition feature matches the "post-condition" feature of the previous action term. If the pre-condition feature of the next action term in the listing matches the "post-condition" feature of the previous action term, then the pre-condition feature of the next action term may be used as further evidence for a value of the attribute to be learned. Thus, for example, in the recipe for butter, it can be determined that the first action term, "melt", post-condition a liquid and that the subsequent action term of "drizzle" has a pre-condition feature of liquid. Hence, there is a match between the post-condition feature of the first action term with the pre-condition feature of the second action term. Therefore, there is additional evidence that another value for the state of matter attribute of butter is "liquid." Thus, knowledge about butter has been acquired indicating that butter may have a state of matter of either solid or liquid.

As discussed above, this process may be repeated until there is a discrepancy between the post-condition feature of a previous action term and a pre-condition feature of the current action term, or until all action terms in the temporally ordered action term listing for an entity have been processed. Through this iterative process, evidence for each value of the learned attribute is accumulated, e.g., counts of instances of a value of the learned attribute may be accumulated. This process may then also be repeated across multiple documents, portions of documents, or the like, e.g., across multiple recipes, to accumulate evidence for each value of the learned attribute.

Confidence scores may then be calculated for each value of the learned attribute based on the accumulated evidence. The confidence scores may be compared to a predetermined threshold value and, for each value whose confidence score meets or exceeds the predetermined threshold, the corresponding value of the learned attribute is maintained in association with the entity as a valid value for the attribute for that entity. For example, if there is sufficient evidence that butter has a state of matter attribute value of "solid" and a state of matter attribute value of "liquid" then both values will be maintained in association with the entity, e.g., added to attribute data for the entity in the entity's data structure.

The values of the attributes maintained for an entity may be generalized up a subsumption hierarchy of the ontology. For example, it may be determined that onions, potatoes, and turnips all have substantial evidence of having a state of matter attribute of "solid." Thus, it may be generalized or inferred that a common ancestor entity in the subsumption hierarchy, i.e. "root vegetables," is also a solid. This allows reasoning to be performed on uncommon root vegetables that have little or no prior information about them in the ontology, e.g., a "skirret" is a root vegetable and thus, based on our generalized knowledge of root vegetables, is most likely a solid.

Figure 5:
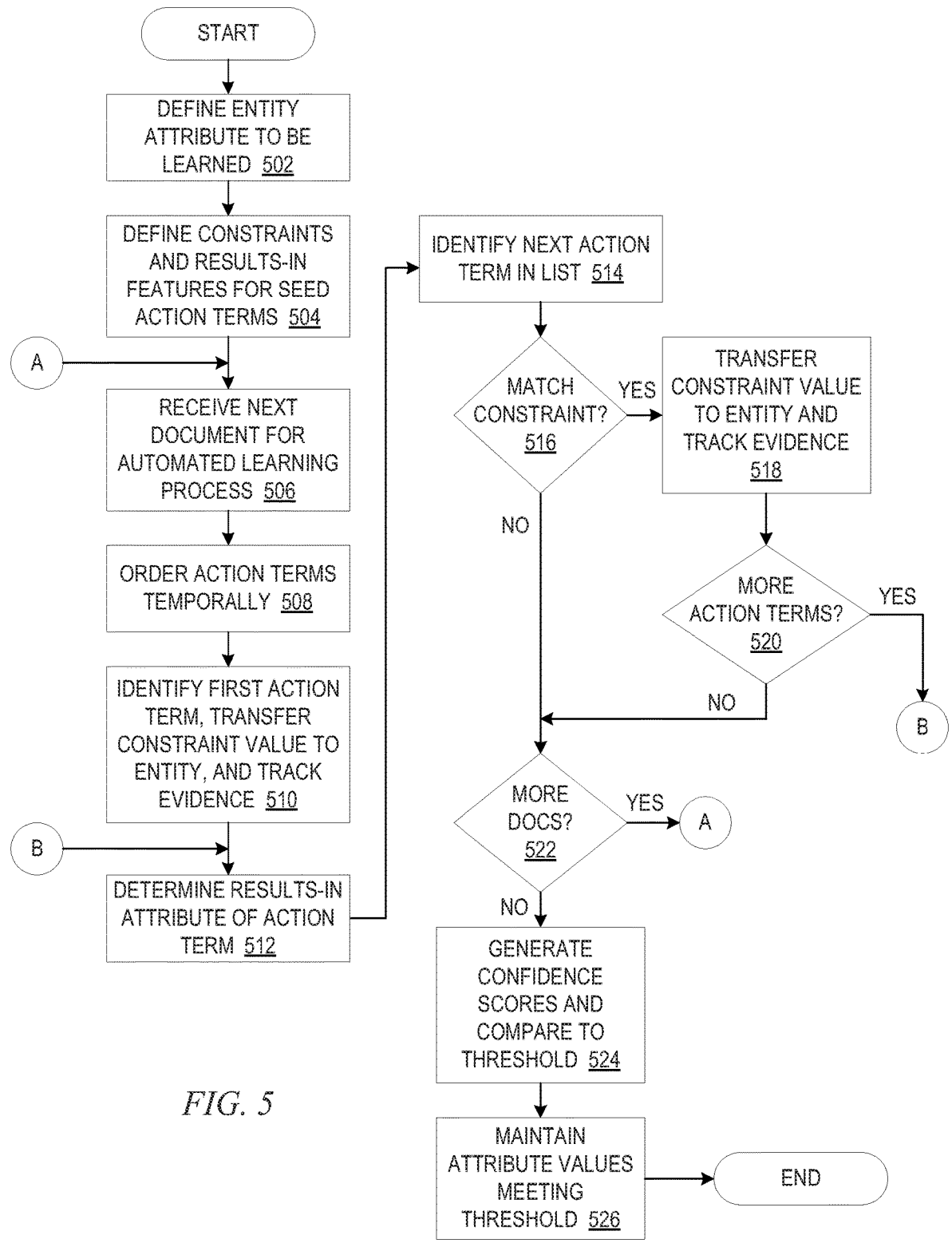
FIG. 5 is a flowchart outlining an example operation for performing an automated bootstrap learning process in accordance with one illustrative embodiment.

FIG. 5 is a flowchart outlining an example operation for performing an automated bootstrap learning process in accordance with one illustrative embodiment. The operation outlined in FIG. 5 may be performed by a knowledge acquisition system, such as system 150 in FIG. 1, for example. While FIG. 5 outlines an operation for performance on a single attribute that is being learned, it should be appreciated that the same set of operations may be performed with regard to multiple attributes that are to be learned.

As shown in FIG. 5, the operation starts by defining an entity attribute to be learned, e.g., a state of matter attribute (step 502). Pre-condition features and post-condition features (the post-condition features are optional depending on the implementation) are defined for a small set of action terms based on the particular entity attribute for which learning is to be performed, e.g., pre-condition features specifying a state of matter required by the action term and post-condition features specifying a state of matter that is generated by the action term (step 504).

A next document, upon which the automated bootstrap based learning processing is to be performed, is received and natural language processing is performed on the document to extract entity and action term features from the natural language content of the document (step 506). For each identified entity in the document (steps 508-526 are performed for each identified entity in the document), a temporally ordered action term listing is generated based on the results of the natural language processing (step 508). The first action term in the corresponding temporally ordered action term listing is identified and its pre-condition feature is transferred to an attribute value for the entity, e.g., if a first action term is "melt" and the pre-condition feature is "solid", then the entity's state of matter attribute value is considered to include the value of "solid" as a candidate (step 510).

The post-condition feature of the action term is determined, e.g., the post-condition feature of the action term "melt" may be "liquid" indicating that the action of melting generates a liquid (step 512). The next action term in the corresponding temporally ordered action term listing, as well as its pre-condition feature, is identified (step 514). A determination is made as to whether the pre-condition feature of the next action term matches the post-condition feature of the previous action term (step 516). If there is a match, then the pre-condition feature of the next action term is transferred as a value to the attribute of the entity (step 518). It should be appreciated that the transferring of values of pre-condition features to values for attributes of the entity includes the accumulation of counts of the number of times those specific values are encountered in the document and across documents such that confidence scores may be later calculated and used to determine which values of the attribute to maintain in association with the entity.

A determination is then made as to whether there are more action terms in the temporally ordered action term listing for the entity (step 520). If there are more action terms, then the operation returns to step 512 where the operation of step 512 is performed on the action term whose pre-condition feature was compared to the post-condition feature of the previous action term in the temporally ordered action term listing. If there are no more action terms in the corresponding temporally ordered action term listing for the entity, then the operation determines whether there are more documents to be processed (step 522). If there are more documents, the operation returns to step 506. Otherwise, confidence scores are calculated for each of the values of the attribute to be learned based on the accumulated evidence and the confidence scores are compared to a threshold confidence score value (step 524). For those attribute values that have confidence scores meeting or exceeding the threshold confidence score value, the attribute values are maintained in association with the entity in an entity data structure of a knowledge base or ontology (step 526). The operation then terminates.

It should be appreciated that while the above illustrative embodiments are described with the action terms having a single pre-condition feature and single post-condition feature, the illustrative embodiments are not limited to such. Rather, in other illustrative embodiments, multiple pre-condition features and post-condition features may be associated with action terms, such as in the case where a separate pre-condition feature and post-condition feature may be defined for each attribute of an entity upon which learning is being performed. As such, depending on the attribute(s) being learned, the corresponding pre-condition features and post-condition features may be evaluated in the manner described above to transfer pre-condition feature values to the attributes of the entity.

Thus, the result of this automated learning process outlined in FIG. 5 is an expanded knowledge base that is expanded with regard to the attributes of the entities for the specific domain or in some cases additional entities and relationships in the knowledge base. The expanded knowledge base may then be utilized to perform various cognitive operations including performing question answering or responding to requests for information, correction of natural language documents or text, expanding upon the content of a natural language document, training/testing of human users, automatic generation of instructions or commands for controlling the operation of an automated system or device, performing monitoring of human actions or interactions with entities and providing constructive feedback or instruction, and/or the like. More details regarding specific embodiments in which various ones of these cognitive operations will be described in greater detail hereafter.

Figure 6:
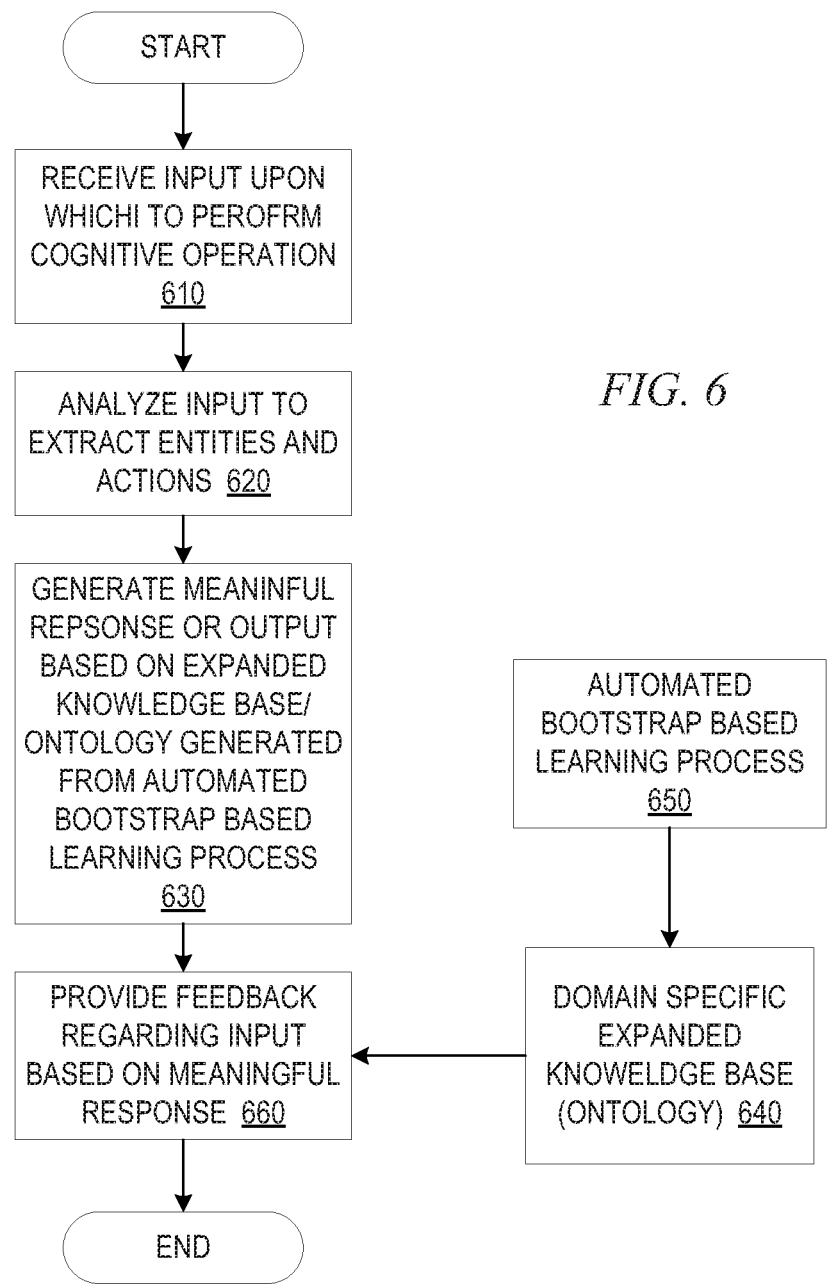
FIG. 6 is a flowchart outlining a cognitive operation that may be performed by a cognitive system in accordance with one illustrative embodiment.

The cognitive operations performed based on the expanded knowledge base or ontology generated by the mechanisms of the illustrative embodiments may be generally represented by the outline shown in FIG. 6. The flowchart of FIG. 6 outlines a cognitive operation that may be performed by a cognitive system in accordance with one illustrative embodiment. As shown in FIG. 6, the operation comprises receiving an input upon which to perform a cognitive operation (step 610). This input may comprise an input natural language question, an input request, an input document that is to be corrected or expanded upon, a set of instructions that are to be analyzed and added to in order to generate instructions/commands for controlling the operation of an automated system or device, automatically acquired audio/video input representing the actions of a human being or automated device with regard to entities in an environment, or the like.

The input is analyzed to extract information regarding entities and actions as well as any other suitable features for performance of the particular cognitive operation (step 620). Based on the analysis of the input by the cognitive system, a meaningful response or output is generated based on the expanded knowledge base or ontology 640 generated via the automated bootstrap based learning process 650 (step 630). The generated result or output is then utilized to provide feedback regarding the input (step 660). For example, this feedback may be an answer to the input natural language question, a response to the input request, a corrected document or suggestions for correcting the document, an output comprising an identification of errors in actions being performed, or the like. The operation then terminates.

With regard to question answering or responding to requests, for example, a user may submit a question/request directed to information that may be obtained from analysis of the knowledge base or ontology. An example question or request may be of the type "What ingredient can be used in place of butter in my recipe?" or "Show me what ingredient to use to replace butter in my recipe." The knowledge base or ontology may be searched to identify the alternatives for butter and the attributes of these alternatives, learned via the automated bootstrap based learning process of the illustrative embodiments, may be further evaluated to determine their appropriateness for inclusion in a user's recipe, e.g., the state of matter attribute may indicate its appropriateness for use as a replacement for butter depending on the state of matter attribute of the butter in the recipe. Various types of questions or requests may be evaluated using the knowledge that is acquired by the automated learning process of the illustrative embodiments.

With regard to correcting a document, such as a recipe, or filling in gaps in a series of instructions for performing an operation, e.g., preparing a recipe, manufacturing an object, performing a laboratory test, etc., a similar analysis as discussed above for expanding the knowledge base or ontology may be performed to identify mismatches in attributes of entities in a temporally ordered action term listing for the entity. That is, similar to the above, during runtime analysis, a cognitive system may analyze an input specifying a series of tasks to be performed to generate a result, e.g., prepare a recipe, manufacture an object, perform a lab test, etc., and thereby generate a temporally ordered action term listing from this input. The constraint terms of the action terms may be compared to possible attribute values of the entity as well as confirmed against the previous actions being performed on the entity to verify that the entity has the correct attribute value as a result of an action prior to the next action being performed. If a mismatch is encountered, then a gap in the instructions may be determined or an incorrect instruction may be identified. A notification of this error may be generated and output.

In some illustrative embodiments, a knowledge base of alternative instructions may be searched to identify one or more instructions associated with the entity which generates the correct attribute value for the entity. The one or more instructions may be used to automatically modify the input to include a corresponding instruction, either in addition to or in replacement of the erroneous instruction. Alternatively, the one or more instructions may be output to a user for consideration for inclusion or replacement of instructions in the input, as suggested changes or updates to the input. Using a recipe and cooking domain as an example, if it is determined that the recipe calls for liquid butter, but there is no previous action for generating liquid butter, then a knowledge base of instructions associated with butter may be searched to find those instructions that result in liquid butter. An example of an instruction of "melt the butter" may be identified and output as a suggested change to the input recipe, automatically inserted into the recipe, or the like. Such functionality may be provided as part of the operations 630 and 660 in FIG. 6.

Training/Testing System

The above illustrative embodiments illustrate mechanisms by which the illustrative embodiments perform bootstrapped automated learning of attributes of entities in a knowledge base or ontology. As noted above, the illustrative embodiments provide mechanisms for performing cognitive operations, such as question answering, request processing, document or instruction set correction/augmentation, or the like, based on the expanded knowledge base or ontology generated via the automated learning process of the illustrative embodiments.

Further illustrative embodiments leverage this automatically acquired knowledge to implement a training and/or testing system to assist with training or testing a human being, or in some cases automated systems or devices, with regard to the performance of an operation that comprises a plurality of tasks, where the tasks may be dependent upon a state of an attribute of the entities upon which the task is performed, and where the state of the attribute of the entities may change based on tasks performed on the entity. As an example, the training/testing system of the illustrative embodiments may be employed to train and/or test human chefs with regard to preparation of a recipe and may provide constructive feedback to the human being regarding the correctness or incorrectness of their responses or actions.

Figure 7:
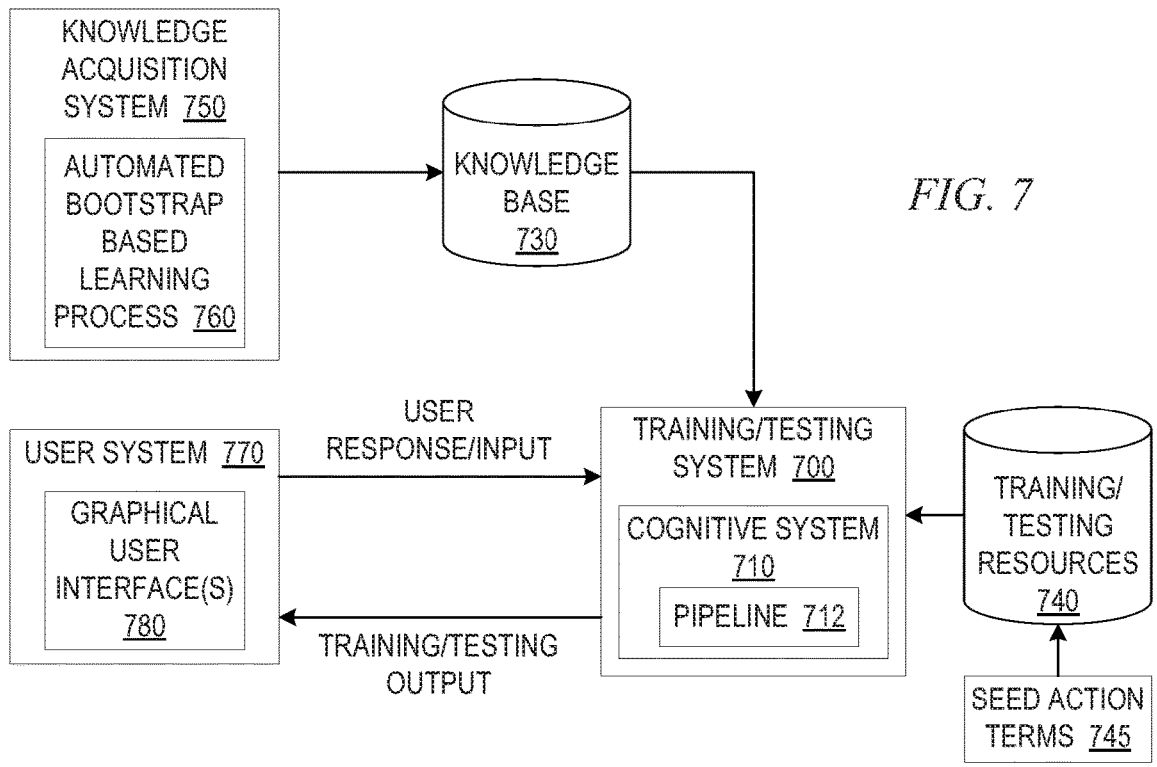
FIG. 7 is an example block diagram illustrating one illustrative embodiment of a testing/training system employing the knowledge acquisition system of the illustrative embodiments.

FIG. 7 is an example block diagram illustrating one illustrative embodiment of a testing/training system employing the knowledge acquisition system of the illustrative embodiments. It should be appreciated that, in FIG. 7, elements directed to systems may be implemented in computing devices, data processing systems, or the like, such as server computing devices 104A-104D, client computing devices 110, 112, or the like, that are specifically configured and execute software instructions for providing the functionality described. Moreover, in some illustrative embodiments, these computing devices and/or data processing systems may have dedicated hardware that is specifically configured to perform one or more of the functions described herein.

As shown in FIG. 7, a cognitive training/testing system 700 comprises cognitive system 710 which may employ a request processing pipeline 712. The cognitive training/testing system 700 may further comprise entity state tracking data structures 720 for tracking the state of an entity according to the user responses, or detected actions, with regard to the entity. The state of the entity may be tracked and compared to the knowledge base 730 in response to verify the attributes of the entity at any particular state. These attributes may be used to verify user responses to test/training outputs from the training/testing system 700.

The expanded knowledge base 730 generated based on the automated bootstrap based learning process 760 of the knowledge acquisition system 750 is provided as input to the training/testing system 700 along with training/testing resources 740. The expanded knowledge base 730, training/testing resources 740, and state tracking data structures 720 may be considered the "corpus" or corpora upon which the processing pipeline 712 of the cognitive system 710 may operate, for example. The training/testing resources 740 may comprise various bases for sending training/testing output to a user via the user's system 770, such as test question sets, training materials, or the like, that specify an operation comprising a series of tasks to be performed with regard to one or more entities to accomplish the operation or generate a desired result. In one illustrative embodiment, the training/testing resources 740 may include recipes for testing the skills of the user, training the user to prepare the recipes, or otherwise evaluate the actions detected by the user on entities with regard to the preparation of a recipe. In some illustrative embodiments, the training/testing resources 740 may further comprise the manually tagged seed action terms set 745 that specifies the pre-condition features and post-condition features of the action terms.

The training/testing system 700 may output training/testing output to a user system 770 based on the training/testing resources 740 to train/test the human user of the user system 770. For example, a training/test question may be output to the user via a graphical user interface 780 output on the user system 770. The user may enter a response to the training/test question via the interface 780 which may then be evaluated by the training/testing system 700 based on the current state of entities as indicated in the state tracker data structures 720, processing of the response and training/test question by the cognitive system 710 and processing pipeline 712, and the knowledge represented in the expanded knowledge base 730. Corresponding outputs may be generated by the training/testing system 700 and output to the user via the interface 780 to inform the user of the correctness/incorrectness of the response, reasoning for any incorrectness, and possible correct responses as well as reasoning for the correctness of these possible correct response. The evaluation of the correctness/incorrectness, as well as the generation of the correct response and reasoning may all be informed by the expanded knowledge base 730.

As an example, the training/testing system 700 of these illustrative embodiments may be used, again using the cooking domain as an example, to train a chef to prepare a recipe where the chef is questioned as to the steps of the recipe and the correctness of those answers is determined by the cognitive system 710 by evaluating the question/answer pair via the pipeline 712, based on the current attributes of the ingredients as tracked in the corresponding state tracking data structures 720. Assume that a user of user system 770 wishes to learn how to prepare the recipe shown in FIG. 4 and sends a request to the training/testing system 700 to instruct the user how to prepare a macaroni and cheese dish with chard as an ingredient. The training/testing system 700 may retrieve a corresponding recipe from a training/testing resources 740 data structure which specifies the ingredients and actions to be performed to prepare the recipe, e.g., an ordered listing of instructions.

The training/testing system 700 may, via the output of the interface 780, send a listing of ingredients for the recipe to the user and request that the user indicate the first step in preparing the mixture. The user may indicate that the butter should be poured over the onions. The analysis of the recipe by the training/testing system 700 indicates that that butter is currently in a solid state, using state tracking data structures 720. Based on the knowledge base 730 it is determined that butter can be in both a solid state and a liquid state.

Moreover, form the action terms 745, it is determined that the action of pouring in the user's response requires an entity in a liquid state, and an action of melting may transform a solid into a liquid. Thus, based on the current state of the butter, it is determined by the training/testing system 700 that the user's response is incorrect with the reason being an incorrect state of the ingredient, i.e. the butter is solid and the action of pouring has a pre-condition feature of the ingredient being a liquid. Moreover, the training/testing system 700 further determines that the correct response is to convert the ingredient from a solid state to a liquid state and that the action of "melting" may be performed to achieve that objective. Furthermore the training/testing system 700 may verify that the particular ingredient, e.g., butter in this example, may exist in both solid and liquid form and thus, the objective is achievable with this ingredient. Thus, the training/testing system 700 may output a response to the user via the interface 780 indicating the incorrectness of the user response, the reason, a correct response, and the reasoning of for the correct response.

FIG. 8A is an example diagram of a training/testing system prompt output that may be provided to a user via a user client system in accordance with one illustrative embodiment. As shown in FIG. 8A, the training/testing system outputs a prompt to the user via the user system 770 and graphical user interface 780, an example of which is depicted in FIG. 8A. In this example, the training/testing system prompt includes a listing of ingredients 810 and a question 820 of the type "What is the first step for generating the macaroni and cheese mixture?" The question is followed by an answer field 830 through which the user may input the use's natural language response to the training/testing question. In this case, the user may input the answer "Pour the butter over the onions." The user's response to the training/testing question 820 is transmitted to the training/testing system which uses the cognitive system 710 and processing pipeline 712 to perform natural language processing of the user's answer and evaluate the answer to the question based on the current state of the ingredients from the state tracking data structures 720, the training/testing resources 740, and the knowledge in the expanded knowledge base 730.

FIG. 8B is an example diagram of an example response of a training/testing system to a user input in accordance with one illustrative embodiment. As shown in FIG. 8B, the response 840 comprises an indicator that the user's response was incorrect 850, the reason the response was incorrect 860, a correct answer 870, and a reason for the correct answer 880. In this example, the reason 860 was incorrect is indicated to be that the ingredient (butter) is solid and pouring the butter requires the butter to be a liquid. The correct answer 870 would be to "melt the butter" and the reason 880 why this is a correct response is because melting the butter generates liquid butter which can then be poured.

It should be appreciated that this is only one example of a training/testing system which may be implemented using the expanded knowledge base generated using an automated bootstrap learning process in accordance with the illustrative embodiments. Other types of training/testing systems may also be implemented and used to train/test human users with regard to an operation comprising a plurality of tasks operating on entities and in which the attributes of the entities affect the tasks or dictate what tasks may be performed on, to, or with the entities.

It should be appreciated that while a graphical user input based interaction between the user and the training/testing system 700 may be used with one illustrative embodiment for evaluating the responses of a user to training/testing prompts, other training/testing systems 700 may utilize other mechanisms for obtaining user input that may be evaluated by the training/testing system 700 for correctness/incorrectness and providing appropriate instruction, confirmation, or correction. For example, in some illustrative embodiments, the user system 770 may further include various multi-media input devices, such as video cameras, audio input devices (e.g., microphones), and the like, through which the actual actions on entities and audible responses may be monitored to generate user input to the training/testing system 700.

That is, the input devices (not shown) of the user system 770 may capture video input of the user while the user is performing tasks they believe will achieve a desired objective for which they are being trained/tested, e.g., preparation of a recipe in the cooking domain example. The video/audio input may be provided to the training/testing system 700 which may perform various processing of the input, such as image recognition analysis, speech-to-text conversion, and the like, to convert the input to a form that the training/testing system 700 may operate on to verify the actions being performed on an entity. For example, image recognition may be used to identify both the entity the user is operating on and the action that the user is performing. This information may be evaluated in a manner previously described above, such as by determining the state of the entity, determining constraints of the action being performed, comparing to knowledge base information, comparing to training/testing resources, and the like, to determine the correctness/incorrectness of the action being performed on the entity, the reason for the incorrectness, a correct action to be performed on an entity, and the reason for the correctness of the correct action. This information may then be output to the user via the user system 770. For example, an audible message may be output indicating the information determined from the evaluation.

Figure 9:
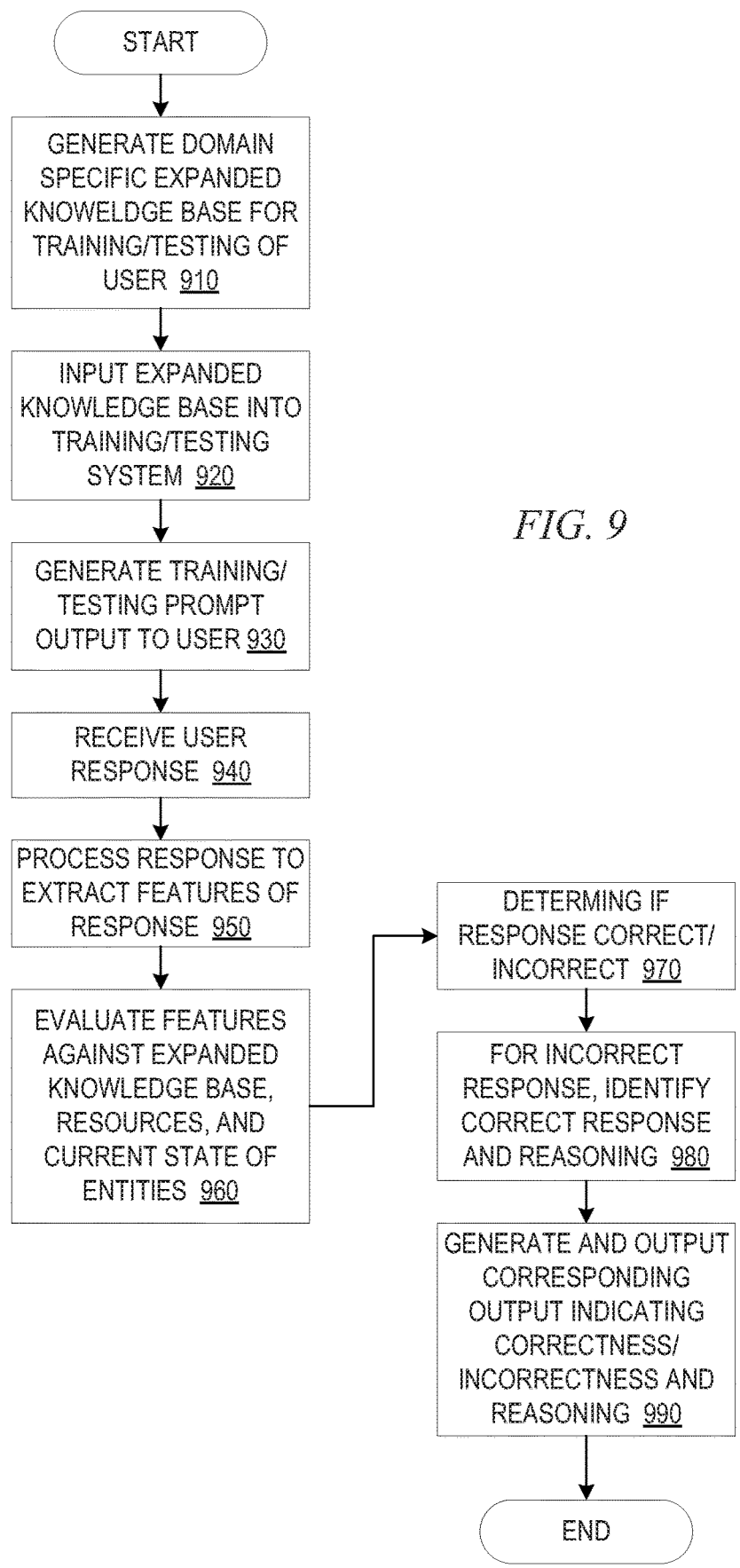
FIG. 9 is a flowchart outlining an example operation for providing a training/testing functionality in accordance with one illustrative embodiment.

FIG. 9 is a flowchart outlining an example operation for providing a training/testing functionality in accordance with one illustrative embodiment. The operation outlined in FIG. 9 may be performed by a combination of the knowledge acquisition system and training/testing system of FIG. 7, for example.

As shown in FIG. 9, the operation starts by generating an expanded knowledge base for a specific domain for which training/testing of a user is to be performed (step 910). The expanded knowledge based is generated using an automated bootstrap based learning process of a knowledge acquisition system in the manner previously described above. The domain specific expanded knowledge base is input to a training/testing system along with domain specific training/testing resources comprising information (step 920). The training/testing system generates a training/testing prompt output that prompts the user for a response (step 930). A user response to the prompt is received (step 940) and the response is processed by the training/testing system to extract features of the response, e.g., identification of entities, identification of action terms, etc. (step 950).

The features of the user response are evaluated against the domain specific expanded knowledge base, the training/testing resources, and a current state of the entities as indicated by an entity state tracking data structure (step 960). A determination is made as to whether the user response is correct or incorrect and if incorrect, the reason why the response is incorrect based on the current state of the entities, the attributes of the entity as indicated by the domain specific expanded knowledge base, and the training/testing resources (step 970). If incorrect, a correct response may be identified and a reason for the correct response may be generated (step 980) and a corresponding output may be provided to the user to inform them of the correctness/incorrectness of the user's response, the reason for any incorrectness, a correct response, and a reason for the correct response (step 990). The operation then terminates.

Automatic Correction/Insertion of Ordered Set of Tasks

In still further illustrative embodiments, mechanisms are provided for performing automatic insertion or correction of an ordered set of tasks for completing an operation or achieving an objective in a particular domain. The insertion/correction may be performed, in some illustrative embodiments, to augment or otherwise complete an already existing set of tasks or instructions for performing tasks. For example, again using the cooking domain as an example, a recipe may be provided that has missing or incorrect instructions. The mechanisms of the illustrative embodiments may be implemented to verify the entity/action pair correctness and thereby determine if there are missing instructions in the recipe and what the nature of those missing instructions may be with regard to correction entity/action pairs. As a simple example, consider a recipe that calls for the pouring of butter into a mixture. The recipe may not previously have had an instruction to melt the butter prior to the pouring instruction and thus, a missing instruction may be determined to exist.

The automatic correction/insertion of ordered sets of tasks based on the detection of missing tasks or gaps in a set of tasks may be used with automated systems that are used to perform the operation or achieve the objective. For example, computing systems, robotic systems, and the like, may make use of the mechanism of the illustrative embodiments to correct/insert instructions for such automated systems when missing instructions or gaps in instructions are determined to exist. For example, in one illustrative embodiment, a robotic chef system may be implemented in which a robotic system is employed to prepare a recipe. The recipe may have missing instructions or gaps in instructions due to human error, for example, where the human being generating the recipe assumes knowledge that the robotic system or computing system does not have. The mechanisms of the illustrative embodiments may implement the automated bootstrap based learning process to expand a domain specific knowledge base and that information may be utilized to "fill in the blanks" of the missing instructions or gaps in the instructions. The identification of the missing instructions or gaps in instructions may implement a similar process of evaluating entity states with regard to action term constraints and post-condition features to identify mismatches in the a temporally ordered action term list for each entity.

Figure 10:
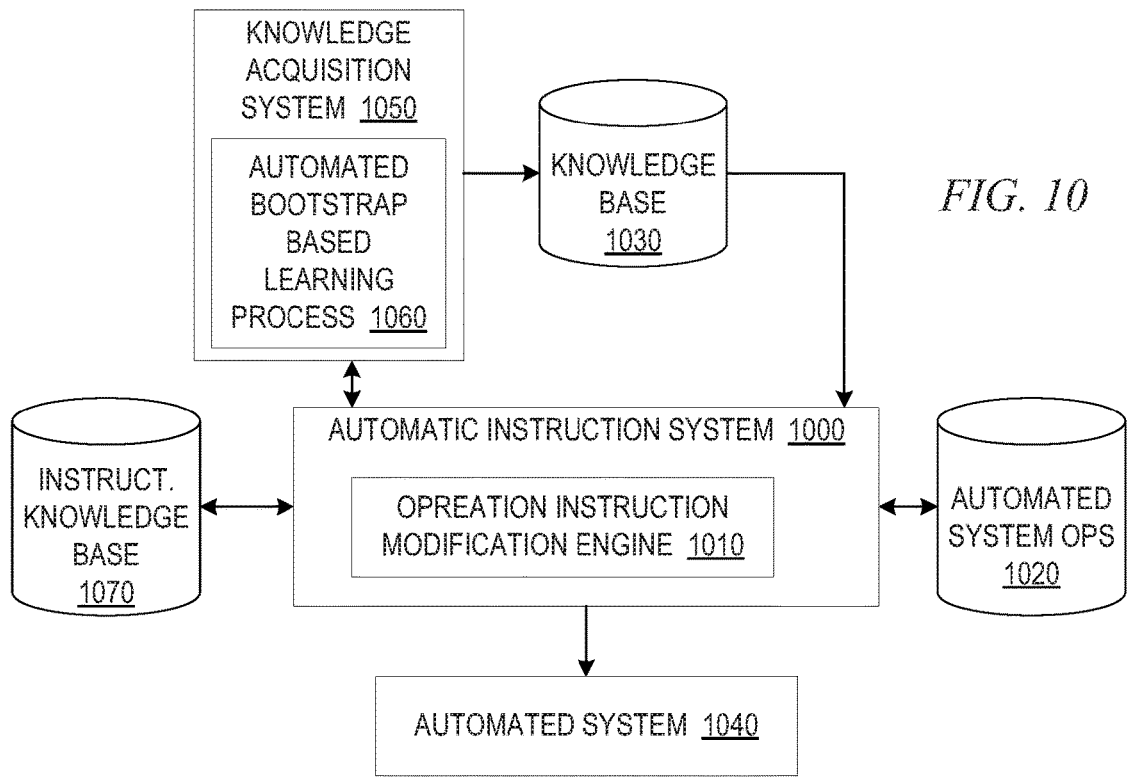
FIG. 10 is an example block diagram illustrating one illustrative embodiment of an automated instruction execution system employing the knowledge acquisition system of the illustrative embodiments.

FIG. 10 is an example block diagram illustrating one illustrative embodiment of an automated instruction execution system employing the knowledge acquisition system of the illustrative embodiments. As shown in FIG. 10, the system comprises an automatic instruction system 1000 comprising an operation instructions modification engine 1010 which modifies an input set of instructions 1020 for performing an operation based on an evaluation of the set of instructions 1020 using the domain specific expanded knowledge base 1030 generated by a knowledge acquisition system 1050 implementing an automated bootstrap based learning process 1060 in accordance with one or more of the illustrative embodiments described above. The resulting modified set of instructions comprising instructions that fill the missing instructions or gaps in instructions in the original set 1020, may be provided to an automated system 1040, such as a robotic system, to perform the set of instructions including those that fill in the missing instructions or gaps.

For example, assume that the automated system 1040 is a robotic chef system that is configured to perform actions on ingredients so as to prepare a recipe represented by a set of instructions from the automated system operations 1020. The automatic instruction system 1000 may receive a request for the automated system 1040 to prepare a specific recipe, for example, and the corresponding recipe may be retrieved from the automated system operations storage 1020. The automatic instruction system 1000 may convert the recipe to a set of instructions that may be executed by the automated system 1040, if the recipe is not already in a form that may be executed by the automated system 1040. The automatic instruction system 1000 may also provide the recipe to the knowledge acquisition system 1050 which may evaluate the recipe in a similar manner as discussed above when performing expansion of the knowledge base 1030.

That is, the knowledge acquisition system 1050 may parse the recipe and generate a temporally ordered action list for each entity in the recipe. The temporal state of the corresponding entity may be tracked by traversing the action terms in the temporally ordered action list, e.g., the butter is first melted and thus, the state of the butter went from solid to liquid, the butter was then poured into a mixture and thus, the state of the butter is a mixture state (which may indicate that actions to the butter by itself can no longer be performed and thus, subsequent actions that do not reference the mixture and instead reference the butter may be erroneous). The temporally ordered action list may be processed to determine if there are any mismatches between pre-condition features of action terms and the then temporal state of the entity. Similar to the mechanisms shown in FIG. 7, in some illustrative embodiments, entity state tracking data structures 1015 may be used to track the temporal state of the entities.

If there are mismatches between pre-condition features of action terms and current temporal state of the entity, then it may be determined that there is a missing instruction or set of instructions in the recipe. For example, assume that a first action term indicates that the butter has been divided meaning that the butter was initially in a solid state and is rendered into a divided solid state. The next action term in the temporally ordered action term listing may indicate that the butter is to be poured into a mixture. The pre-condition feature of the action term "pour" requires a liquid entity, e.g., a liquid form of an ingredient, however by tracking the temporal state of the entity, it is determined that the current state of the butter entity is a divided solid. As a result, a mismatch is identified between the pre-condition feature of the action term and the current state of the entity. The error may be noted and a corresponding notification generated and sent to the automatic instruction system 1000 to inform the automatic instruction system 1000 of the mismatch and potential missing instructions or gaps.

Thereafter, the set of instructions may be automatically corrected or updated by the operation instruction modification engine 1010 to include any missing instructions required to provide the entity with the required attribute value based on the identification of mismatches in the constraints and the attributes of the entities. In some illustrative embodiments, the detection of this mismatch or error indicates missing instructions and an instruction knowledge base 1070 may be searched by the operation instruction modification engine 1010 for instructions that result in the required attribute for the entity required by the pre-condition feature of the action term, e.g., an instruction that results in liquid butter for use with a subsequent action term that requires liquid butter as part of its pre-condition feature, e.g., melt the butter. Additional cognitive operations may be performed by the operation instruction modification engine 1010 to ensure compatibility of the discovered instructions with the other instructions present in the existing listing of instructions, e.g., in a recipe, set of manufacturing instructions, or the like.

Similarly, at each stage of checking the pre-condition features of an action and the current state of the entity, it may also be determined, based on the domain specific expanded knowledge base 1030, whether an action term requires a certain attribute of the entity and whether or not the entity can or cannot have that value of the attribute, e.g., none of the values for the attribute exist in association with the entity, then an error may be identified. For example, if it is determined that an action term has a pre-condition feature that the entity must be in liquid form, e.g., the action term "pour", but none of the state of matter attribute values for the entity allow for a liquid state of matter, then an error is determined for which no missing instructions can be provided. In such a case, the error may simply be used to generate a notification of an uncorrectable error to a system administrator or the like (not shown).

The resulting modified set of instructions, comprising the instructions for filling in the missing instructions or gaps in instructions, ma be provided to the automated system 1040, which may be a robotic system such as a robotic chef in this example. The automated system 1040 may then implement the modified set of instructions to perform the operation or achieve the desired result, e.g., prepare the recipe.

Thus, the automatic instruction system 1000 may be provided with an initial sparsely populated set of instructions to achieve a desired objective, e.g., generate a food item according to a recipe, generate an object according to a set of manufacturing instructions, perform a specific test on an entity based on a set of instructions, or the like. Based on this sparsely populated set of instructions, a dynamic determination of the missing intervening instructions, corresponding to the instruction gaps, may be automatically performed and corresponding instructions for filling the gaps may be automatically generated or selected based on analysis of the attributes of entities and recognizable action terms in the sparsely populated set of instructions. The mechanisms of the illustrative embodiments thus, "fill in the blanks" and provide the necessary additional instructions to instruct the automated system to perform the missing operations to achieve the desired result.

Figure 11:
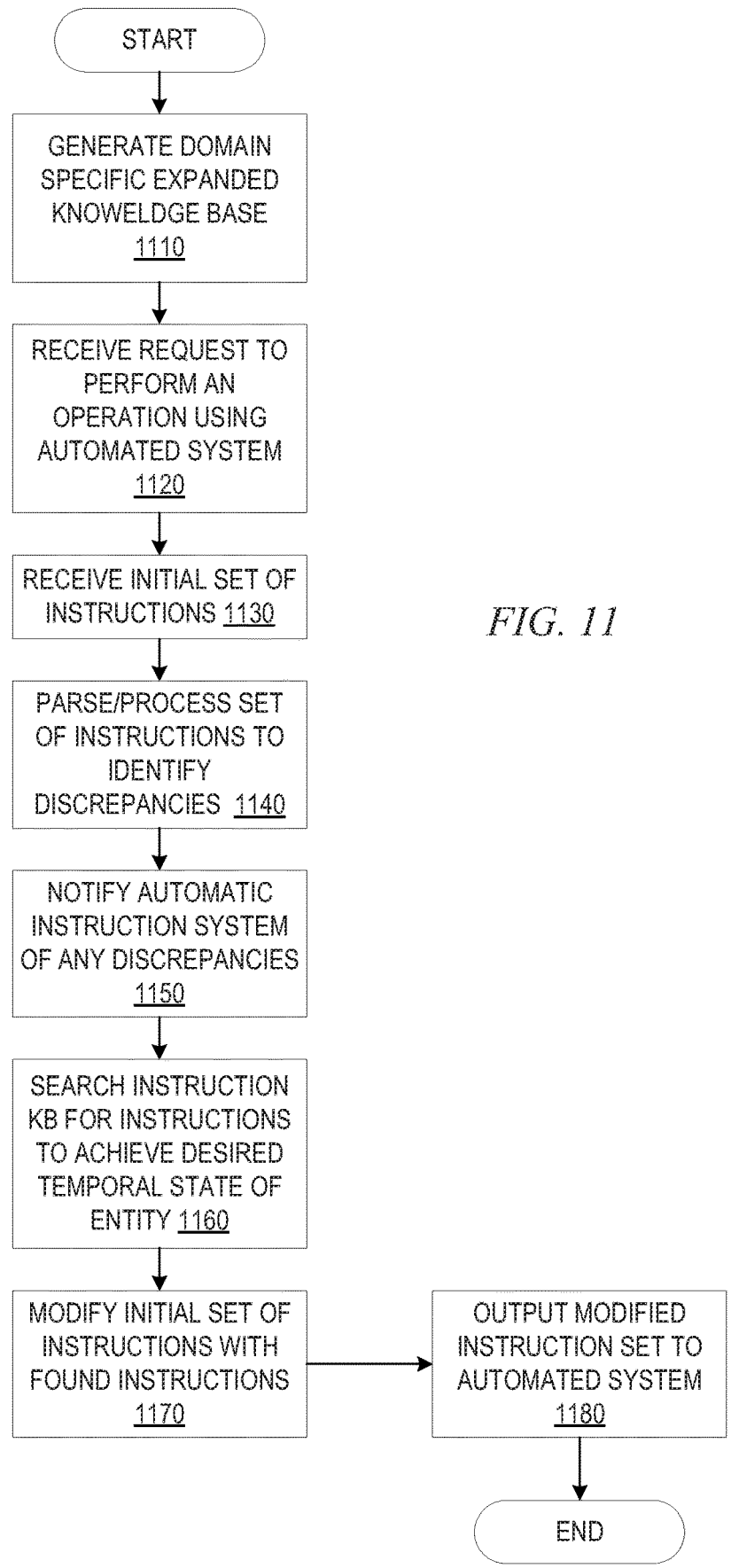
FIG. 11 is a flowchart outlining an example operation for performing automated correction/insertion of instructions for an automated system in accordance with one illustrative embodiment.

FIG. 11 is a flowchart outlining an example operation for performing automated correction/insertion of instructions for an automated system in accordance with one illustrative embodiment. The operation outlined in FIG. 11 may be implemented by a combination of the knowledge acquisition system and automatic instruction system of FIG. 10, for example.

As shown in FIG. 11, the operation starts by generating an expanded knowledge base for a specific domain for which an operation is to be performed by an automated system (step 1110). The expanded knowledge base is generated using an automated bootstrap based learning process of a knowledge acquisition system in the manner previously described above. The knowledge base may be provided to an automated instruction system for use in generating/selecting instructions for filling in identified missing instructions or gaps in instructions of an initial set of instructions.

The automatic instruction system receives a request to perform an operation using an automated system (step 1120). A corresponding initial set of instructions is retrieved/generated for performing the operation (step 1130). The initial set of instructions is parsed and processed by a knowledge acquisition system to identify any discrepancies between constrain requirements of actions to be performed and the temporal state of an entity (step 1140).

Any discrepancies are notified to the automatic instruction system (step 1150) which then performs further processing (including a search of an instruction knowledge base) or otherwise generates instructions for achieving a desired temporal state of the entity upon which the action whose constraint requirement is not satisfied by the initial set of instructions (step 1160). The initial set of instructions is then modified to include the identified/generated instructions (step 1170) and the modified set of instructions is output to the automated system for automated execution of the modified set of instructions (step 1180). The operation then terminates.

Situations might arise when multiple actions have the right post-condition feature to correct a given set of instructions. In such situations, the system may rely on additional evidence coming from the corpus domain (e.g., prior recipes). Such evidence may take the form of the frequency of co-occurrence of the action and ingredient. An illustrative example comes from the domain of cooking. For example, assume a recipe calls for "sprinkling the bread over the chicken". The system recognizes that bread is "solid" while "sprinkle" requires an argument of "particulate". A search of the knowledge base returns a set of actions that transform a "solid" into a "particulate," such as "pulverize", "grind", "crumble", and the like. To select the most appropriate action from this list, the system may perform additional processing, such as gathering co-occurrence evidence between the action ("pulverize", "grind", and "crumble") and the object ("bread"). Because the most frequent action performed on bread from among these is crumble, this action may be selected. Such co-occurrence information may come directly from text, but it may still be affected by the problems identified earlier (e.g. prior actions performed on an ingredient change its state). Therefore, a knowledge resource like the one built using the mechanisms described earlier may be leveraged.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory accessible by the processor, for training a human user to perform an operation, the method comprising:

generating, by the data processing system, a domain specific knowledge base comprising a set of entities and corresponding domain specific attributes;

expanding, by the data processing system, the domain specific knowledge base to include values for the domain specific attributes through an automated bootstrap learning process that performs natural language processing and analysis of natural language content using a set of pre-condition annotated action terms, thereby generating an expanded domain specific knowledge base;

obtaining, by the data processing system, an input from another device identifying an action associated with an entity in the set of entities;

retrieving, by the data processing system, from the expanded domain specific knowledge base, a domain specific attribute value for the entity identified in the input and a pre-condition annotation associated with the action identified in the input;

evaluating, by the data processing system, a correctness or incorrectness of the input based on the retrieved domain specific attribute value and the retrieved pre-condition annotation;

outputting, by the data processing system, a notification to a user computing device indicating whether the input is correct or incorrect to thereby train a user associated with the user computing device; and maintaining, by the data processing system, a temporal ordering of actions performed with regard to the entity identified in the input, wherein evaluating the correctness or incorrectness of the input based on the retrieved domain specific attribute value and the retrieved pre-condition annotation is further performed based on a current state of the entity as determined from a post-condition annotation associated with an action term corresponding to a last performed action in the temporal ordering of actions performed with regard to the entity.

2. The method of claim 1, wherein the bootstrap learning process associates a value with a domain specific attribute of an entity, in the set of entities, based on a pre-condition value of a pre-condition annotation of an instance of an action term, in the set of pre-condition annotated action terms, that is correlated with the entity in the natural language content.

3. The method of claim 2, wherein the another device is the user computing device, and wherein the input is an input from the user in response to a training inquiry presented to the user based on the expanded domain specific knowledge base.

4. The method of claim 1, wherein the another device is a sensor device that detects an input from a user representative of the action and the entity.

5. The method of claim 4, wherein the sensor device is at least one of an image capturing device or an audio capturing device, and wherein the evaluation of the correctness or incorrectness of the input comprises performing at least one of image analysis or audio analysis to identify the action and the entity.

6. The method of claim 1, wherein evaluating, by the data processing system, a correctness or incorrectness of the input based on the retrieved domain specific attribute value and the retrieved pre-condition annotation further comprises:

evaluating a post-condition of a previous action performed with regard to the entity to determine a new value for the domain specific attribute indicating a result of the performance of the previous action on the entity; and correlating the new value for the domain specific attribute with the retrieved pre-condition annotation.

7. The method of claim 1, wherein pre-condition annotations of the set of pre-condition annotated action terms specify, for each pre-condition annotated action term, a required value of a domain specific attribute of an entity upon which an action corresponding to the pre-condition annotated action term may be correctly performed.

8. The method of claim 1, wherein the entities in the set of entities are ingredients for cooking recipes, and wherein the action terms in the set of pre-condition annotated action terms are actions that are able to be performed on the ingredients, and wherein, for each pre-condition annotation action term in the set of pre-condition action terms, a pre-condition annotation of the pre-condition annotated action term specifies a state of matter of an ingredient required in order for a corresponding action to be correctly performed on the ingredient.

9. The method of claim 1, wherein the entities in the set of entities and the pre-condition annotated action terms in the set of pre-condition annotated action terms are associated with a domain in which temporally ordered tasks are to be followed to complete an operation.

10. A computer program product comprising a computer readable storage medium having a computer readable program stored therein, wherein the computer readable program, when executed on a data processing system, causes the data processing system to:

generate a domain specific knowledge base comprising a set of entities and corresponding domain specific attributes;

expand the domain specific knowledge base to include values for the domain specific attributes through an automated bootstrap learning process that performs natural language processing and analysis of natural language content using a set of pre-condition annotated action terms, thereby generating an expanded domain specific knowledge base;

obtain an input from another device identifying an action associated with an entity in the set of entities;

retrieve, from the expanded domain specific knowledge base, a domain specific attribute value for the entity identified in the input and a pre-condition annotation associated with the action identified in the input;

evaluate a correctness or incorrectness of the input based on the retrieved domain specific attribute value and the retrieved pre-condition annotation;

output a notification to a user computing device indicating whether the input is correct or incorrect to thereby train a user associated with the user computing device; and maintain a temporal ordering of actions performed with regard to the entity identified in the input, wherein evaluating the correctness or incorrectness of the input based on the retrieved domain specific attribute value and the retrieved pre-condition annotation is further performed based on a current state of the entity as determined from a post-condition annotation associated with an action term corresponding to a last performed action in the temporal ordering of actions performed with regard to the entity.

11. The computer program product of claim 10, wherein the bootstrap learning process associates a value with a domain specific attribute of an entity, in the set of entities, based on a pre-condition value of a pre-condition annotation of an instance of an action term, in the set of pre-condition annotated action terms, that is correlated with the entity in the natural language content.

12. The computer program product of claim 11, wherein the another device is the user computing device, and wherein the input is an input from the user in response to a training inquiry presented to the user based on the expanded domain specific knowledge base.

13. The computer program product of claim 10, wherein the another device is a sensor device that detects an input from a user representative of the action and the entity.

14. The computer program product of claim 13, wherein the sensor device is at least one of an image capturing device or an audio capturing device, and wherein the evaluation of the correctness or incorrectness of the input comprises performing at least one of image analysis or audio analysis to identify the action and the entity.

15. The computer program product of claim 10, wherein the computer readable program further causes the data processing system to evaluate a correctness or incorrectness of the input based on the retrieved domain specific attribute value and the retrieved pre-condition annotation further at least by:

evaluating a post-condition of a previous action performed with regard to the entity to determine a new value for the domain specific attribute indicating a result of the performance of the previous action on the entity; and correlating the new value for the domain specific attribute with the retrieved pre-condition annotation.

16. The computer program product of claim 10, wherein pre-condition annotations of the set of pre-condition annotated action terms specify, for each pre-condition annotated action term, a required value of a domain specific attribute of an entity upon which an action corresponding to the pre-condition annotated action term may be correctly performed.

17. The computer program product of claim 10, wherein the entities in the set of entities are ingredients for cooking recipes, and wherein the action terms in the set of pre-condition annotated action terms are actions that are able to be performed on the ingredients, and wherein, for each pre-condition annotation action term in the set of pre-condition action terms, a pre-condition annotation of the pre-condition annotated action term specifies a state of matter of an ingredient required in order for a corresponding action to be correctly performed on the ingredient.

18. An apparatus comprising:

a processor; and a memory coupled to the processor, wherein the memory comprises instructions which, when executed by the processor, cause the processor to:

generate a domain specific knowledge base comprising a set of entities and corresponding domain specific attributes;

expand the domain specific knowledge base to include values for the domain specific attributes through an automated bootstrap learning process that performs natural language processing and analysis of natural language content using a set of pre-condition annotated action terms, thereby generating an expanded domain specific knowledge base;

obtain an input from another device identifying an action associated with an entity in the set of entities;

retrieve, from the expanded domain specific knowledge base, a domain specific attribute value for the entity identified in the input and a pre-condition annotation associated with the action identified in the input;

evaluate a correctness or incorrectness of the input based on the retrieved domain specific attribute value and the retrieved pre-condition annotation;

output a notification to a user computing device indicating whether the input is correct or incorrect to thereby train a user associated with the user computing device; and maintain a temporal ordering of actions performed with regard to the entity identified in the input, wherein evaluating the correctness or incorrectness of the input based on the retrieved domain specific attribute value and the retrieved pre-condition annotation is further performed based on a current state of the entity as determined from a post-condition annotation associated with an action term corresponding to a last performed action in the temporal ordering of actions performed with regard to the entity.

* * * * *